(12) United States Patent
Lee et al.

(10) Patent No.: US 10,701,125 B2
(45) Date of Patent: Jun. 30, 2020

(54) METHOD AND APPARATUS FOR TRANSMITTING AND RECEIVING DATA IN WIRELESS COMMUNICATION SYSTEM

(71) Applicant: Samsung Electronics Co., Ltd., Gyeonggi-do (KR)

(72) Inventors: Joohyung Lee, Gyeonggi-do (KR); Jinsung Lee, Seoul (KR); Jung Shin Park, Seoul (KR); Jicheol Lee, Gyeonggi-do (KR); Hyungho Lee, Seoul (KR); Hanna Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 480 days.

(21) Appl. No.: 15/074,962

(22) Filed: Mar. 18, 2016

(65) Prior Publication Data
US 2016/0277475 A1    Sep. 22, 2016

(30) Foreign Application Priority Data

Mar. 20, 2015 (KR) .................. 10-2015-0039012

(51) Int. Cl.
*G06F 15/16* (2006.01)
*H04L 29/06* (2006.01)

(52) U.S. Cl.
CPC .......... *H04L 65/80* (2013.01); *H04L 65/4069* (2013.01); *H04L 65/607* (2013.01)

(58) Field of Classification Search
CPC ..................................................... H04L 65/80

USPC ........ 709/219, 217, 203, 224, 226; 382/299, 382/232, 274; 370/229, 235
See application file for complete search history.

(56) References Cited

U.S. PATENT DOCUMENTS

| | | | |
|---|---|---|---|
| 8,527,647 B2 | 9/2013 | Gopalakrishnan | |
| 8,804,508 B1* | 8/2014 | Hobbs | H04N 21/2042 370/230 |
| 2004/0223455 A1* | 11/2004 | Fong | H04W 52/365 370/229 |
| 2004/0260939 A1* | 12/2004 | Ichikawa | G06F 21/10 726/5 |
| 2005/0028209 A1* | 2/2005 | Sinisalo | H04M 1/72527 725/62 |
| 2005/0049005 A1* | 3/2005 | Young | H04M 1/72544 455/566 |
| 2005/0058307 A1* | 3/2005 | Yang | H04H 60/04 381/119 |
| 2005/0165796 A1* | 7/2005 | Moore | G06F 16/51 |

(Continued)

OTHER PUBLICATIONS

Huang, et al.; "A Buffer-Based Approach to Rate Adaptation: Evidence From a Large Video Streaming Service"; SIGCOMM; Aug. 17-22, 2014; Chicago, IL; 14 pages.

(Continued)

*Primary Examiner* — Thuong Nguyen

(57) ABSTRACT

A method and apparatus for transmitting and receiving data in a wireless communication system is provided. A method of a mobile station includes: storing data received from a server in a buffer; transmitting, to the server, a request message for updating a quality of the data stored in the buffer from a first quality to a second quality based on at least one of an available bandwidth and a buffer level; and receiving data of the second quality from the server.

20 Claims, 18 Drawing Sheets

(56) References Cited

U.S. PATENT DOCUMENTS

| | | | | |
|---|---|---|---|---|
| 2005/0244081 | A1* | 11/2005 | Zhou | G06T 3/4053 |
| | | | | 382/299 |
| 2006/0072838 | A1* | 4/2006 | Chui | G06F 3/0481 |
| | | | | 382/232 |
| 2007/0041657 | A1* | 2/2007 | Rychagov | G06K 9/036 |
| | | | | 382/274 |
| 2008/0049618 | A1* | 2/2008 | Ishii | H04L 47/10 |
| | | | | 370/235 |
| 2009/0085740 | A1* | 4/2009 | Klein | G08B 13/19695 |
| | | | | 340/540 |
| 2010/0149202 | A1* | 6/2010 | Yoshikawa | G06F 12/0864 |
| | | | | 345/557 |
| 2010/0189179 | A1* | 7/2010 | Gu | H04N 19/105 |
| | | | | 375/240.16 |
| 2010/0189183 | A1* | 7/2010 | Gu | H04N 21/23439 |
| | | | | 375/240.28 |
| 2010/0328528 | A1* | 12/2010 | Eggert | H03M 13/356 |
| | | | | 348/425.2 |
| 2011/0102834 | A1* | 5/2011 | Makishima | G06F 3/1222 |
| | | | | 358/1.15 |
| 2012/0297430 | A1* | 11/2012 | Morgos | H04L 65/4084 |
| | | | | 725/88 |
| 2013/0204927 | A1* | 8/2013 | Kruglikov | G06F 9/54 |
| | | | | 709/203 |
| 2013/0212220 | A1* | 8/2013 | Fukuda | H04W 36/14 |
| | | | | 709/217 |
| 2014/0003799 | A1* | 1/2014 | Soroushian | H04N 9/8227 |
| | | | | 386/353 |
| 2014/0250230 | A1* | 9/2014 | Brueck | H04L 65/607 |
| | | | | 709/226 |

OTHER PUBLICATIONS

Mok, et al.; "QDASH: A QoE-Aware DASH System"; MMSy; Feb. 22-24, 2012; Chapel Hill, NC; 12 pages.

* cited by examiner

METHOD AND APPARATUS FOR TRANSMITTING AND RECEIVING DATA IN WIRELESS COMMUNICATION SYSTEM

CROSS-REFERENCE TO RELATED APPLICATION AND CLAIM OF PRIORITY

The present application is related to and claims the benefit of priority under 35 U.S.C. § 119 to an application filed in the Korean Intellectual Property Office on Mar. 20, 2015 and assigned Ser. No. 10-2015-0039012, the contents of which are incorporated herein by reference.

TECHNICAL FIELD

Embodiments of the present disclosure relate to a method and apparatus for upgrading a quality of data in a wireless communication system.

BACKGROUND

In recent years, video streaming services for terminals in wireless communication systems are increasingly used. The quality of the video streaming service provided to terminals in a wireless environment depends on a channel state. For example, the terminal may be provided with a video streaming service of a high quality when the channel state is good. On the other hand, when the channel state is poor, the terminal may be provided with a video streaming service of a low quality. However, when a buffer is not sufficiently filled due to a conservative streaming request method for preventing video interruptions, video streaming of a low quality may be provided.

SUMMARY

Therefore, there is a need for technology for upgrading a quality of a video streaming service in response to a channel state which is variable in a wireless communication system.

To address the above-discussed deficiencies, it is a primary object to provide at least the advantages described below. Accordingly, the present disclosure provides a method and apparatus for upgrading a quality of a video service based on a channel state in a wireless communication system.

Another aspect of the present disclosure provides a method and apparatus for changing data of a low quality which is pre-stored in a buffer to data of a high quality based on a currently available bandwidth and an amount of data stored in the buffer in a terminal of a wireless communication system.

According to an aspect of the present disclosure, a method of a mobile station includes: storing data received from a server in a buffer; transmitting, to the server, a request message for updating a quality of the data stored in the buffer from a first quality to a second quality based on at least one of an available bandwidth and a buffer level; and receiving data of the second quality from the server.

According to another aspect of the present disclosure, a method of a server includes: transmitting data of a first quality to a mobile station; receiving, from the mobile station, a message requesting to transmit data of a second quality corresponding to the data of the first quality; and transmitting the data of the second quality to the mobile station based on an encoding method of the data.

According to another aspect of the present disclosure, an apparatus of a mobile station includes: a communication unit configured to communicate with a server; a buffer configured to store data received from the server; and a controller configured to control to transmit, to the server, a request message for updating a quality of some of the data stored in the buffer from a first quality to a second quality based on at least one of an available bandwidth and a buffer level, and receive data of the second quality from the server.

According to another aspect of the present disclosure, an apparatus of a server includes: a communication unit configured to communicate with a mobile station; and a controller configured to control transmit data of a first quality to the mobile station, receive, from the mobile station, a message requesting to transmit data of a second quality corresponding to the data of the first quality, and transmit the data of the second quality to the mobile station based on an encoding method of the data.

According to embodiments of the present disclosure, a mobile station in a wireless communication system may change data of a low quality received in a poor channel state to data of a high quality based on a currently available bandwidth and an amount of data stored in a buffer, and thus provide a video streaming service of a higher quality to the user in a secure state without a danger of buffer under-run.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present disclosure will be described herein below with reference to the accompanying drawings. In the following description, well-known functions or constructions are not described in detail since they would obscure the invention in unnecessary detail. Also, the terms used herein are defined according to the functions of the present disclosure. Thus, the terms may vary depending on user's or operator's intension and usage. Therefore, the terms used herein must be understood based on the descriptions made herein.

Embodiments of the present disclosure describe a wireless communication network, and operations performed in the wireless communication network may be performed in a process of controlling a network and transmitting data in a system (for example, a base station) which manages the corresponding wireless communication network, or may be performed in a mobile station which is connected to the corresponding wireless network.

The wireless communication system according to embodiments of the present disclosure includes a plurality of base stations (BSs). Each of the base stations provides a communication service for a specific geographical region (normally, referred to as a cell). The cell may be divided into a plurality of areas (referred to as a sector). The base station refers to a fixed station normally communicating with mobile stations, and may be replaced with other terms such as evolved-NodeB (eNB), a Base Transceiver System (BTS), an access point, etc.

A mobile station (MS) may be fixed or may have mobility, and may be replaced with other terms such as User Equipment (UE), a Mobile Terminal (MT), a User Terminal (UT), a Subscriber Station (SS), a wireless device, a Personal Digital Assistant (PDA), a wireless modem, a handheld device, etc.

Hereinafter, a method and apparatus for upgrading a quality of a video streaming service in a wireless communication system will be explained.

Figure 1:
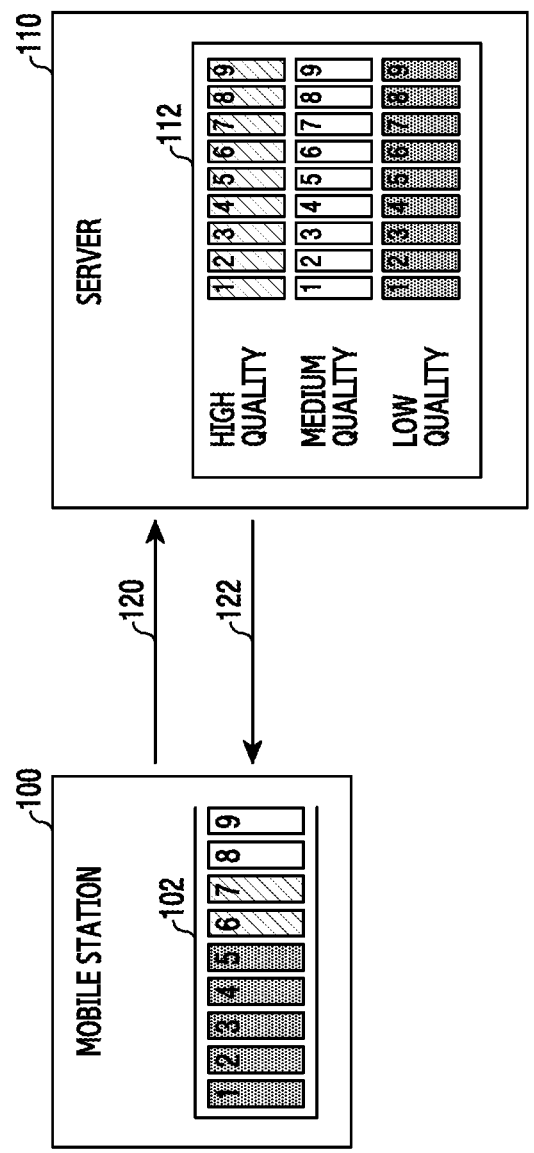
FIG. 1 illustrates a configuration of a wireless communication system which supports a video streaming service according to embodiments of the present disclosure.

FIG. 1 illustrates a configuration of a wireless communication system which supports a video streaming service according to embodiments of the present disclosure.

Referring to FIG. 1, a server 110 stores various video contents in a storage 112 to provide a video streaming service to a mobile station 100. Regarding each of the video contents, the server 110 may store video contents which are encoded at various encoding rates and have different qualities (for example, 235 kbps to 5 Mbps). For example, regarding a video content A, the server 110 may store a video content A of a high quality which is encoded at a first encoding rate, a video content A of a medium quality which is encoded at a second encoding rate, and a video content A of a low quality which is encoded at a third encoding rate. In this case, the server 110 may divide encoded data constituting each of the video contents by a predetermined size, and store the data. For example, the server 110 may divide the encoded data constituting the video content on a chunk basis, and store the data. In addition, the server 110 may store a manifest file including information related to the video contents A. For example, the server 110 may store the manifest file including chunk index information, chunk size information, and quality level information of the video content A. The chunk index information may indicate the number of chunks constituting a corresponding video content, and the quality level information may indicate how many levels the quality of the video content A is classified into. In addition, the chunk size information may indicate size information of a chunk for each quality. According to embodiments of the present disclosure, the quality may refer to an image quality of a video content.

The mobile station 100 may detect generation of a video streaming service event and request data of a specific video content from the server 110 (operation 120). For example, the mobile station 100 may acquire the manifest file including information related to the video content A from the server 110, and periodically request new data (hereinafter, referred to as a "chunk" for convenience of explanation in embodiments of the present disclosure) of a specific quality regarding the video content A based on information on the acquired manifest file and a state of a currently available bandwidth. In this case, the quality of the new chunk that the mobile station 100 requests from the server 110 may depend on the state of the available bandwidth at the corresponding time. In addition, the mobile station 100 may transmit a chunk index to the server 110 and request to transmit a chunk having the corresponding index.

When a request for data of a video content is received from the mobile station 100, the server 110 may retrieve the data of the video content requested by the mobile station 100 from the storage 112, and transmit the retrieved data to the mobile station 100 (operation 122). For example, the server 110 may receive a request for a chunk of a specific quality regarding the video content A from the mobile station 100, and retrieve the chunk of the corresponding quality from the storage 112 and transmit the chunk.

The mobile station 100 may store the chunk of the specific quality received from the server 110 in a receiving buffer 102, and reproduce the stored chunk.

Additionally, according to embodiments of the present disclosure, the mobile station 100 may upgrade the quality of the chunk stored in the receiving buffer 102. For example, the mobile station 100 may determine whether it is possible to upgrade the qualities of the chunks stored in the receiving buffer 102 based on a buffer level indicating the amount of chunks stored in the receiving buffer 102 and the state of the currently available bandwidth. When the mobile station has determined that it is possible to upgrade the qualities of the chunks stored in the receiving buffer 102, the mobile station 100 may select chunks which do not satisfy a predetermined quality criterion from the chunks stored in the receiving buffer 102, and request the server 110 to upgrade the qualities of the selected chunks. The server 110 may identify the chunks that are requested to have their qualities upgraded by the mobile station 100, and search a chunk for upgrading the quality from the storage 112 and transmit the chunk to the mobile station 100. Herein, the server 110 may search a chunk of a specific quality to be upgraded and transmit the chunk to the mobile station 100, or transmit a chunk including only additional information necessary for upgrading to a specific quality to the mobile station 100 according to an encoding method of the chunk which is requested to have its quality upgraded. The mobile station 100 may upgrade the quality of the chunk selected from the chunks stored in the receiving buffer 102 based on the chunk received from the server 110.

Figure 2A:
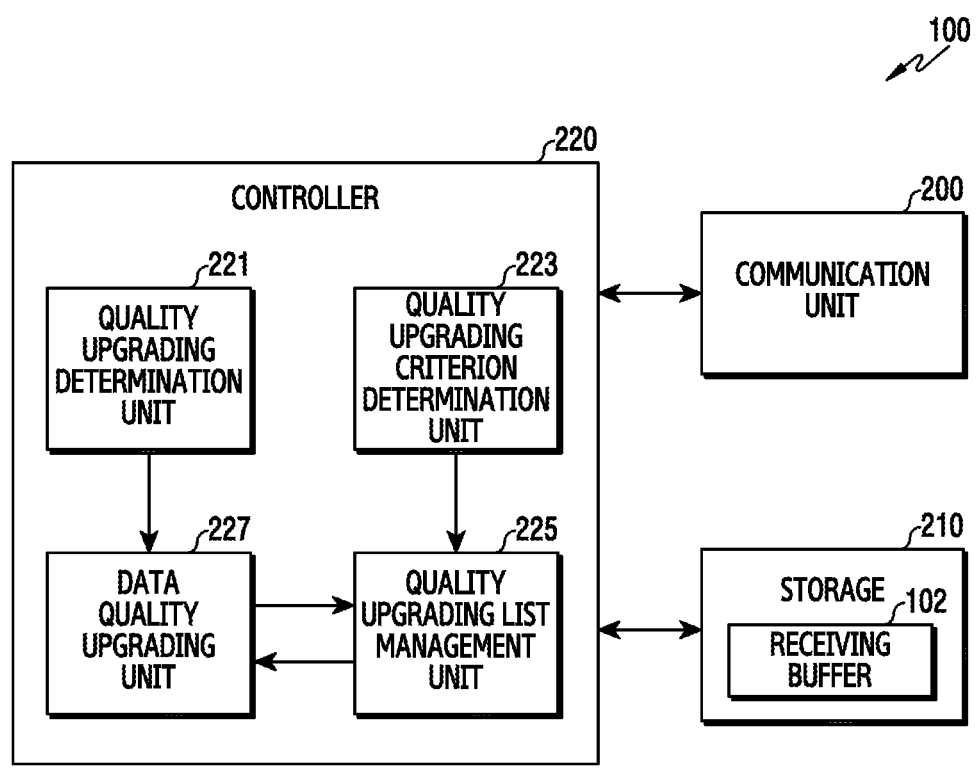
FIG. 2A illustrates a block diagram of a mobile station according to embodiments of the present disclosure.

FIG. 2A illustrates a block diagram of a mobile station according to embodiments of the present disclosure.

Referring to FIG. 2A, the mobile station 100 may include a communication unit 200, a storage 210, and a controller 220.

The communication unit 200 may exchange signals with the server 110 through a wireless communication network. The communication unit 200 may exchange signals with the server 110 through at least one wireless communication system under the control of the controller 220. For example, the communication unit 200 may receive a chunk of a video content from the server 110 through a first system. In another example, the communication unit 200 may receive a new chunk of a video content from the server 110 through the first system, and simultaneously, receive a chunk of a specific quality for upgrading the quality of a chunk stored in the storage 210 or a chunk which is formed of additional information necessary for upgrading to a specific quality through a second system.

The storage 210 may store various data and programs necessary for the operations of the mobile station 100. According to embodiments of the present disclosure, the storage 210 may include a receiving buffer 102 for a video streaming service, and store chunks received from the server 110 in the receiving buffer 102.

The controller 220 may control and process the overall operations of the mobile station 100, and control and perform a function for providing a video streaming service according to embodiments of the present disclosure. The controller 220 may include at least one processor.

When a video streaming service event for reproducing a specific video content is detected, the controller 220 may acquire a manifest file including information related to the selected video content from the server 110. The controller 220 may acquire chunk size information, chunk index information, and quality level information regarding the selected video content based on the acquired manifest file. The controller 220 may periodically measure an available bandwidth, and determine an index and a quality of a chunk to be requested from the server 110 at a corresponding period based on the measured available bandwidth and the information acquired from the manifest file. For example, the controller 220 may periodically measure the available bandwidth according to HTTP Adaptive Streaming (HAS) technology, and may request a chunk of a quality which can be supported in the measured bandwidth from the server 110. The controller 220 may periodically store the chunks received from the server 110 in the receiving buffer 102, reproduce the chunks stored in the receiving buffer 102, and provide the chunks to the user through an output unit (not shown). The output unit may include a display unit, a speaker, etc.

Additionally, according to embodiments of the present disclosure, the controller 220 may control and perform a function for upgrading the qualities of the chunks stored in the receiving buffer 102. For example, the controller 220 may control and perform the function for upgrading the qualities of the chunks previously stored in the receiving buffer 102 without influencing reception of a new chunk for the video streaming service. The controller 220 may include a quality upgrading determination unit 221, a quality upgrading criterion determination unit 223, a quality upgrading list management unit 225, and a data quality upgrading unit 227 to upgrade the qualities of the chunks stored in the receiving buffer 102.

The quality upgrading determination unit 221 may determine whether it is possible to upgrade the qualities of the chunks stored (or buffered) in the receiving buffer 102 without influencing a new chunk which is periodically received for a video streaming service. For example, the quality upgrading determination unit 221 may request and receive a new chunk of the video content based on the result of measuring the currently available bandwidth, and simultaneously, determine whether it is possible to receive an additional chunk for upgrading the quality of the previously received chunk. First, the quality upgrading determination unit 221 may compare a buffer level indicating the amount of chunks stored in the receiving buffer 102 and a predetermined threshold level in order to determine whether a current buffer satisfies a condition for upgrading the quality of the buffered chunk. When the buffer level is higher than the threshold level, the quality upgrading determination unit 221 may determine that the current buffer satisfies the condition for upgrading the quality of the buffered chunk. Herein, the buffer level and the threshold level are compared to prevent buffer under-run. For example, when the s stored in the receiving buffer 102 are not sufficient, the reproduction of the video content may be interrupted. Accordingly, in order to prevent such a phenomenon, the quality upgrading determination unit 221 may determine that the condition for upgrading the quality of the chunk buffered in the receiving buffer 102 is not satisfied when the buffer level is lower than the threshold level.

When the current buffer is determined to satisfy the condition for upgrading the quality of the buffered chunk, the quality upgrading determination unit 221 may additionally determine whether the currently available bandwidth satisfies the condition for upgrading the quality of the chunk. For example, the quality upgrading determination unit 221 may check whether the available bandwidth can support reception of an additional chunk while supporting reception of a new chunk to be requested next time. For example, the quality upgrading determination unit 221 may check whether the available bandwidth is greater than an encoding rate of a chunk to be currently requested by more than a threshold margin. The available bandwidth may be acquired by dividing the size of the requested chunk by total time required to download the requested chunk (size of a requested chunk/time required to download the requested chunk). The available bandwidth may be measured every time the chunk is received, and may be used for determining the quality of the next chunk. In addition, the encoding rate is a criterion for determining an image quality of a chunk and may be determined by dividing the entire size of a video content by total reproduction time. The encoding rate may be received from the server through the manifest file. When the available bandwidth is greater than the encoding rate of the chunk to be currently requested by more than the threshold margin (encoding rate+threshold margin<available bandwidth), the quality upgrading determination unit 221 may determine that the currently available bandwidth satisfies the condition for upgrading the quality of the chunk.

When the current buffer satisfies the condition for upgrading the quality of the buffered chunk and the currently available bandwidth satisfies the condition for upgrading the quality of the chunk, the quality upgrading determination unit 221 may determine that it is possible to upgrade the qualities of the chunks stored in the receiving buffer 102 without influencing the reception of the new chunk. When it is determined that it is possible to upgrade the qualities of the chunks previously stored in the receiving buffer 102, the quality upgrading determination unit 221 may transmit a command (or a signal) to instruct to upgrade data to the data quality upgrading unit 227.

The quality upgrading criterion determination unit 223 determines a criterion for selecting chunks of qualities to be upgraded from the chunks stored in the receiving buffer 102. The quality upgrading criterion determination unit 223 may identify the quality level information indicating how many levels the quality of the video content is classified into from the manifest file, and determine a criterion for selecting chunks of qualities to be upgraded based on the identified quality level information.

The quality upgrading criterion determination unit 223 may determine at least one of an upper bound, a lower bound, and a normal threshold value as a criterion. The upper bound may be used as a criterion value for selecting all chunks except the chunks of the highest quality level from among the various quality levels of the corresponding video content. The lower bound may be used as a criterion value for selecting chunks of the lowest quality level from among the various quality levels of the corresponding video content. The normal threshold value may be determined based on a certain level from among the various quality levels of the corresponding video content, and may be used as a criterion value for selecting chunks having qualities lower than the determined level.

The quality upgrading list management unit 225 generates and manages a quality upgrading list according to the chunk selecting criterion determined by the quality upgrading criterion determination unit 223. For example, the quality upgrading list management unit 225 may select chunks which satisfy the selecting criterion from the chunks stored in the receiving buffer 102, and generate and manage the quality upgrading list including information on the selected chunks. The quality upgrading list may include information on quality levels of the selected chunks, and encoding method of the selected chunks. For example, it is assumed that chunks 1-9 are stored in the receiving buffer 102 of the mobile station 100, and chunks 1-5 have a "low quality," chunks 6-7 have a "high quality," and chunks 8-9 have a "medium quality" as shown in FIG. 1. In this case, when the chunk selecting criterion is the upper bound, the quality upgrading list management unit 225 may select chunks 1-5 and 8-9 from chunks 1-9 stored in the receiving buffer 102, and generate and manage the quality upgrading list including indexes, quality levels, and encoding methods of selected chunks 1-5 and 8-9. In this case, the quality upgrading list may include information indicating that the quality level of chunks 1-5 is the "low quality" and the encoding method is a non-layered method, and the quality level of chunks 8-9 is the "medium level" and the encoding method is a layered method.

Figure 3:
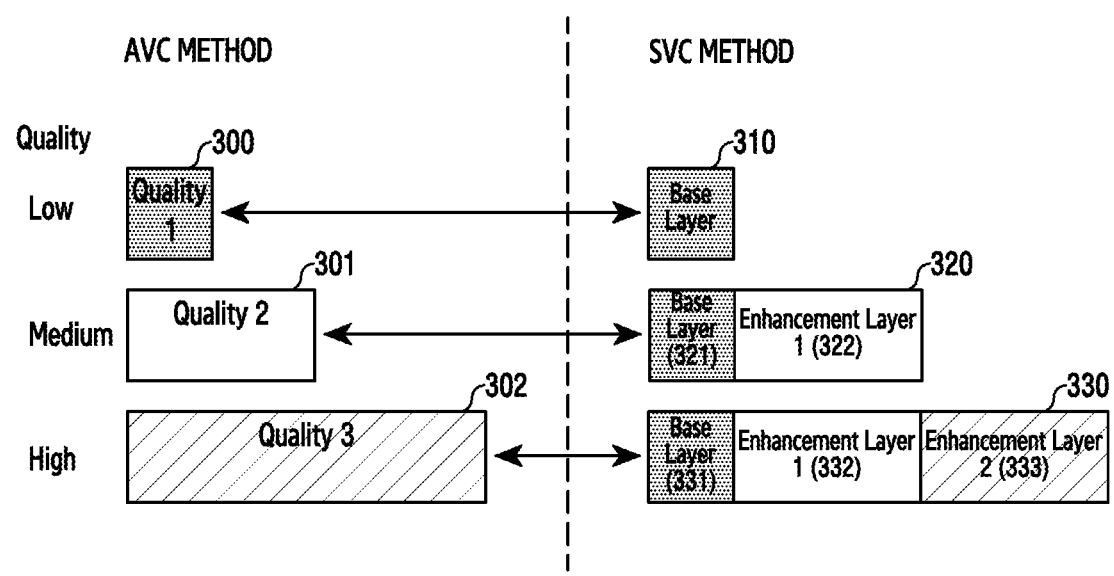
FIG. 3 illustrates a structure of data according to an encoding method according to embodiments of the present disclosure.

As shown in FIG. 3, the representative encoding method of the non-layered method may include an Advanced Video Coding (AVC) method, and the representative encoding method of the layered method may include a Scalable Video Coding (SCV) method. Each of chunks 300, 301, and 302, which are encoded at different encoding rates in the ACV method and are of different qualities, is formed of independent data. On the other hand, each of chunks 310, 320, and 330, which are encoded at different encoding rates in the SVC method and are of different qualities, may not be independent and may have a hierarchical structure which is not independent. For example, chunk 310 which is of the lowest quality in the SVC method may include only base-layer data expressing a video image; chunk 320 of the medium quality may include base-layer data 321 and primary enhancement-layer data 322 including additional information; and chunk 330 of the highest quality may include base-layer data 331, primary enhancement-layer data 332, and secondary enhancement-layer data 333. Herein, chunk 310 of the lowest quality, the base-layer data 321 included in chunk 320 of the medium quality, and the base-layer data 331 included in chunk 330 of the highest quality are the same data. In addition, the primary enhancement-layer data 321 included in chunk 320 of the medium quality and the primary enhancement-layer data 331 included in chunk 330 of the highest quality are the same data. For example, the SVC method may further include the enhancement-layer data including additional information, so that the quality of the chunk can be upgraded. In addition, the quality level of the chunk may indicate an encoding rate. For example, the mobile station 100 may determine an encoding rate of a corresponding chunk based on the quality level of the chunk. The quality upgrading list management unit 225 may update the quality upgrading list based on the chunk selecting criterion periodically, every time a predetermined event occurs, or every time the chunk is received.

In addition, the quality upgrading list management unit 225 may monitor the receiving buffer 102 to detect whether a chunk the information of which is included in the quality upgrading list is reproduced or not, and may delete the information of the chunk which is detected as being reproduced from the quality upgrading list. For example, in a state in which chunks 1-9 are stored in the receiving buffer 102 and the information of chunks 1-5 and 8-9 is included in the quality upgrading list, when chunks 1-3 are reproduced and thus are deleted from the receiving buffer 102, chunks 1-3 may be deleted from the quality upgrading list.

In addition, the quality upgrading list management unit 225 may communicate with the data quality upgrading unit 227 to detect whether there exists a which is requested to have its quality upgraded through the server 110 from among the chunks the information of which is included in the quality upgrading list. When it is detected that there exists the chunk which is requested to have its quality upgraded through the server 110 from among the chunks the information of which is included in the quality upgrading list, the quality upgrading list management unit 225 may delete the information of the corresponding chunk from the quality upgrading list.

When a command (or a signal) instructing to upgrade data is received from the quality upgrading determination unit 221, the data quality upgrading unit 227 may acquire the quality upgrading list from the quality upgrading list management unit 225, and determine a chunk of a quality to be upgraded based on the acquired quality upgrading list. According to embodiments, the data quality upgrading unit 227 may determine a chunk of a quality to be upgraded from among all chunks except chunks which are likely to be reproduced within a threshold time from among the chunks the information of which is included in the acquired quality upgrading list. For example, when the information of chunks 1-5 and 8-9 is included in the quality upgrading list, the data quality upgrading unit 227 may determine that chunks 1-3 are likely to be reproduced within the threshold time, and determine at least one chunk of a quality to be upgraded at a corresponding time from among chunks 4, 5, 8 and 9 which are not likely to be reproduced within the threshold time. According to another embodiment, when the information of chunks 1-5 and 8-9 is included in the quality upgrading list, the data quality upgrading unit 227 may determine a chunk which is determined to be reproduced at a later time from among chunks 1-5 and 8-9 as a chunk of a quality to be upgraded first. For example, the quality of chunk 9 may be upgraded first and the quality may be upgraded in order of chunks 8, 5, 4, 3, 2, and 1. Herein, while the quality of chunk 9 is upgraded, the chunk which is reproduced may be deleted from the quality upgrading list.

The data quality upgrading unit 227 may identify the quality of the determined chunk and determine a target quality to be upgraded based on the quality upgrading list. According to embodiments, the target quality of the determined chunk may be determined to the highest level or may be determined to be a level which is higher than the quality of the chunk stored in the receiving buffer by one level. According to embodiments, the data quality upgrading unit 227 may identify an encoding method of the determined chunk based on the quality upgrading list, and may request to upgrade the quality of the chunk in a different method according to the identified encoding method. For example, when the quality of chunk 4 determined from the quality upgrading list is a low quality and the encoding method is the AVC, the data quality upgrading unit 227 may request the server 110 to transmit chunk 4 of the high quality. In another example, when the quality of chunk 4 determined from the quality upgrading list is a low quality and the encoding method is the SVC, the data quality upgrading unit 227 may request the server 110 to transmit enhancement-layer data including additional information for upgrading chunk 4 of the low quality to have a high quality. According to embodiments, the data quality upgrading unit 227 may transmit, to the server 110, the index of the determined chunk, information on the quality level to be upgraded, and information on the encoding method of the corresponding chunk, and request to upgrade the quality of the corresponding chunk.

Figure 4A:
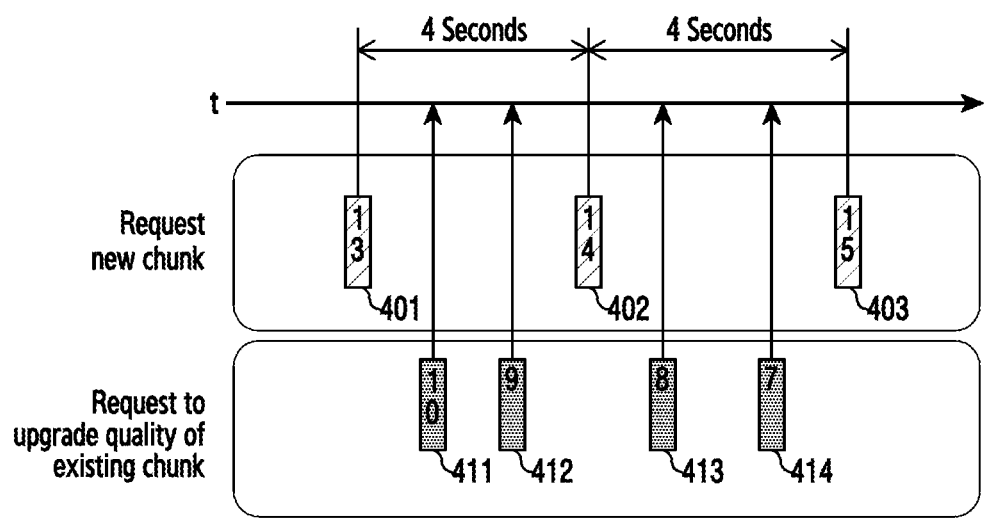
FIG. 4A illustrates a method for requesting to upgrade a quality of data which supports Advanced Video Coding (AVC) in the mobile station according to embodiments of the present disclosure.
Figure 5A:
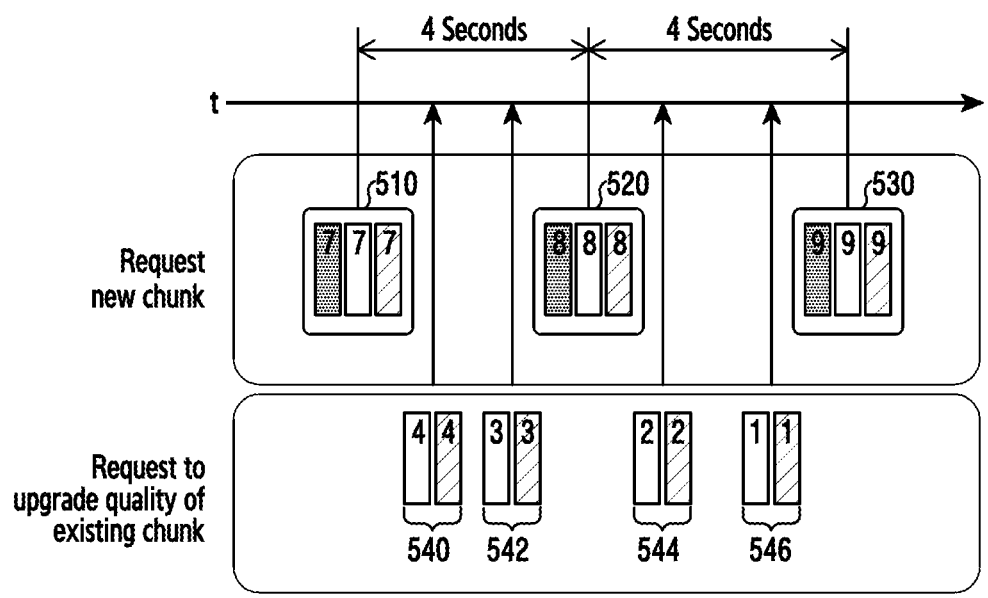
FIG. 5A illustrates a method for requesting to upgrade a quality of data which supports Scalable Video Coding (SVC) in the mobile station according to embodiments of the present disclosure.

Additionally, the data quality upgrading unit 227 may request to upgrade the quality of a chunk in a period except a period during which a new chunk of the video content is requested. For example, since the data quality upgrading unit 227 requests a new chunk every four seconds, the data quality upgrading unit 227 may transmit a message for requesting to upgrade the quality of the chunk stored in the receiving buffer 102 to the server 110 during a period between the times at which the new chunks are requested. For example, as shown in FIG. 4A, in a state in which chunks 1-12 of the video content encoded in the AVC method are received, the data quality upgrading unit 227 may request and receive chunks 13, 14, and 15 (referred to by reference numbers 401, 402, and 403, respectively) from server 110 at predetermined time intervals, for example, every four seconds. In this case, the data quality upgrading unit 227 may request to upgrade qualities of chunks 7-10 (referred to by reference numbers 411-414, respectively) which are of a low quality from among the chunks stored in the receiving buffer 102 during the period between the times at which chunks 13, 14, and 15 are requested and received, and may receive chunks 7-10 of upgraded qualities. In another example, as shown in FIG. 5A, in a state in which chunks 1-6 of the video content encoded in the SVC method are received, the data quality upgrading unit 227 may request and receive chunks 7, 8, and 9 (referred to by reference numbers 510, 520, and 530) at predetermined time intervals, for example, every four seconds. In this case, the data quality upgrading unit 227 may request to upgrade the qualities of chunks 4, 3, 2, and 1 (namely, chunks 4-1) which are of a low quality from among the chunks stored in the receiving buffer 102 during the period between the times at which chunks 7, 8, and 9 are requested and received, and may receive enhancement-layer data 540, 542, 544, and 546 including additional information of chunks 4-1 for upgrading the quality.

Figure 4B:
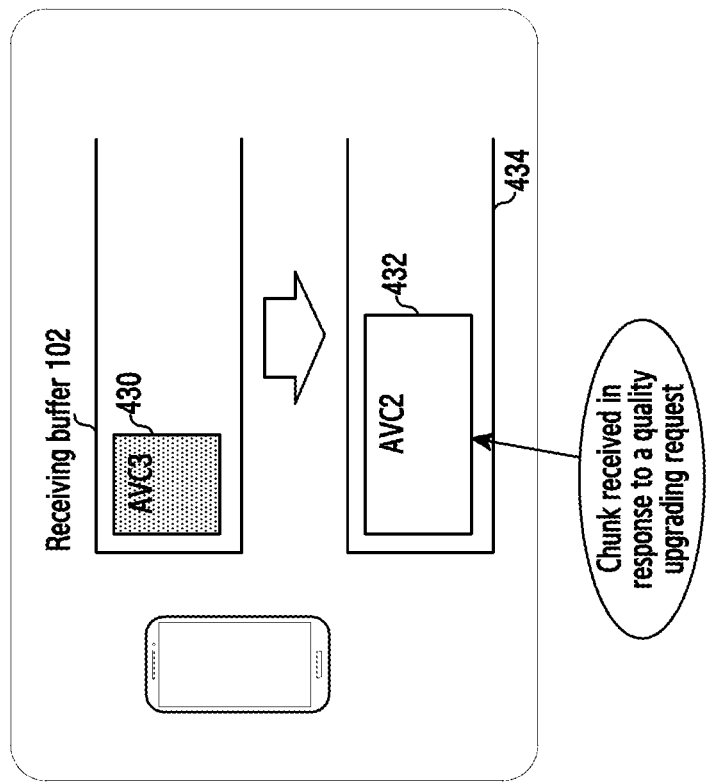
FIG. 4B illustrates a method for upgrading a quality of data which supports AVC for a buffer in the mobile station according to embodiments of the present disclosure.
Figure 4B:
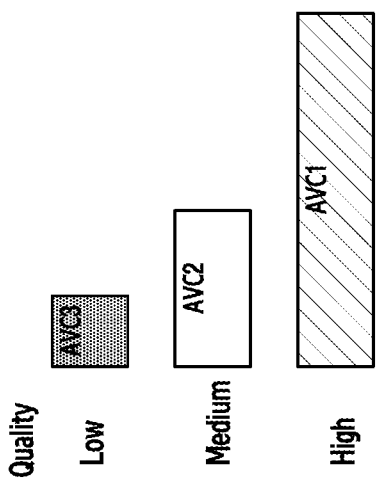
Figure 5B:
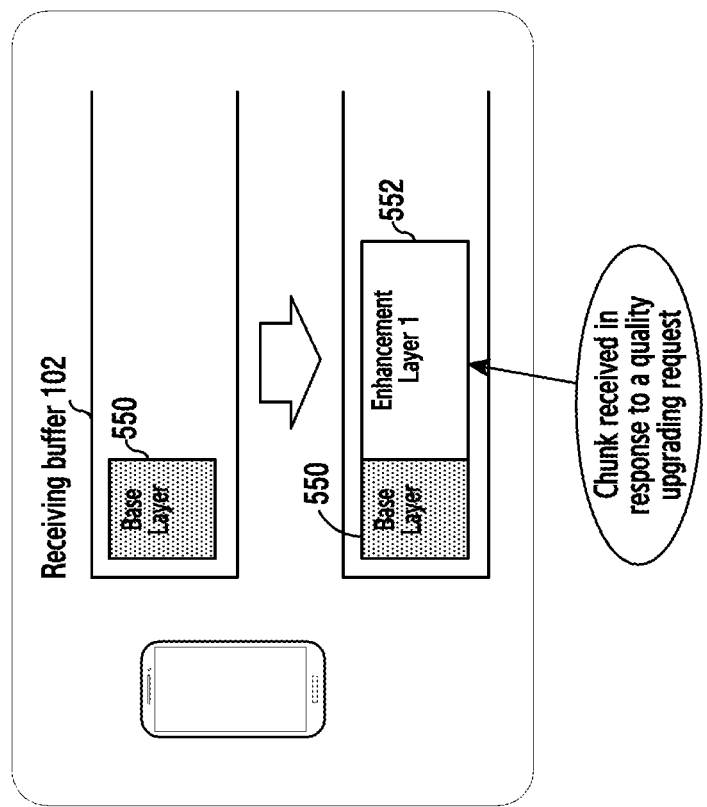
FIG. 5B illustrates a method for upgrading a quality of data which supports SVC for the buffer in the mobile station according to embodiments of the present disclosure.
Figure 5B:
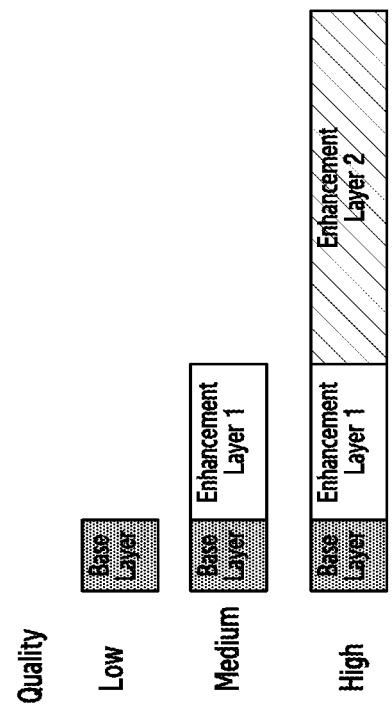

In addition, the data quality upgrading unit 227 may process the chunk which is received in response to the quality upgrading request in a different method according to the encoding method. According to embodiments, as shown in FIG. 4B, with respect to a chunk encoded in the AVC method, the data quality upgrading unit 227 may substitute chunk 430 of low quality stored in the receiving buffer 102 with chunk 432 of a medium quality which is received in response to the quality upgrading request, and reproduce chunk 432. In this case, the data quality upgrading unit 227 may use a method for changing a pointer value indicating a chunk of a low quality stored in the receiving buffer 102 to indicate a chunk which is received in response to the quality upgrading request. In addition, the data quality upgrading unit 227 may store the chunk 432 received in response to the quality upgrading request using an additional separate receiving buffer 434. According to another embodiment, as shown in FIG. 5B, with respect to a chunk encoded in the SVC method, the data quality upgrading unit 227 may combine 550 of a low quality stored in the receiving buffer 102 and chunk 552 which includes enhancement-layer data received in response to the quality upgrading request, and reproduce the combined chunk. In this case, the data quality upgrading unit 227 may store the additional information using an additional separate receiving buffer, and control to combine the additional information with the chunks of low qualities stored in the receiving buffer 102 to reproduce the chunks.

Figure 2B:
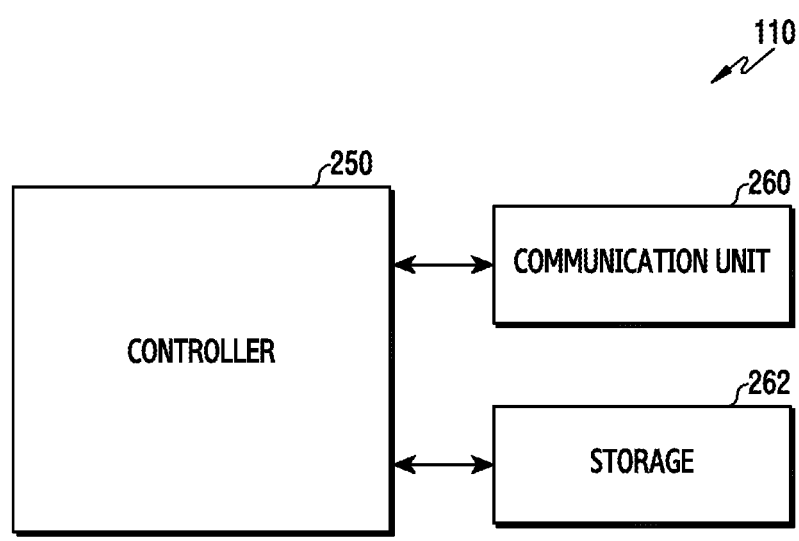
FIG. 2B illustrates a block diagram of a server according to embodiments of the present disclosure.

FIG. 2B illustrates a block diagram of a server according to embodiments of the present disclosure.

Referring to FIG. 2B, the server 110 may include a communication unit 260, a storage 262, and a controller 250.

The communication unit 260 may exchange signals with the mobile station 100 through a wireless communication network. The communication unit 260 may exchange signals with the mobile station 100 through at least one wireless communication system under the control of the controller 250. For example, the communication unit 260 may receive a request for a chunk of a video content from the mobile station 100 and transmit the requested to the mobile station 100.

The storage 262 may store various data and programs necessary for the operations of the server 110. According to embodiments of the present disclosure, with respect to a specific video content, the storage 262 may store chunks of different qualities which are encoded at various encoding rates. Herein, the video contents stored in the storage 262 may be encoded in different encoding methods. For example, a video content A may be encoded in the AVC method and a video content B may be encoded in the SVC method. In addition, the storage 262 may store a manifest file including chunk index information, chunk size information, and quality level information regarding the video contents.

The controller 250 may control and process the overall operations of the server 110, and control and perform a function for providing a video streaming service to the mobile station 100 according to embodiments of the present disclosure. The controller 250 may include at least one processor.

The controller 250 may be requested to transmit the manifest file regarding the video content by the mobile station 100, and may control and process a function for transmitting the manifest file regarding the requested video content. In addition, the controller 250 may be requested to transmit a chunk of a specific quality regarding a specific video content by the mobile station 100, and control and process a function for searching the chunk of the corresponding quality from the storage 262 and transmitting the chunk to the mobile station 100. For example, the controller 250 may receive a chunk request message including a index and quality information from the mobile station 100, and search the chunk of the corresponding quality from the storage 262 based on the chunk index and the quality information which are included in the chunk request message, and transmit the chunk to the mobile station 100. In addition, the controller 250 may receive a chunk quality upgrading request message from the mobile station 100 and acquire chunk index information, information on a quality level to be upgraded, and information on an encoding method from the chunk quality upgrading request message. The controller 250 may search the chunk corresponding to the corresponding quality and the chunk index from the storage 262 based on the acquired information, and may transmit the entirety or part (for example, enhancement-layer data) of the searched chunk to the mobile station 100 according to the encoding method. For example, the controller 250 may acquire information indicating "chunk index: 10, quality level to be upgraded: high quality, and encoding method: AVC" from the chunk quality upgrading request message, and search chunk 10 corresponding to the high quality and then transmit chunk 10 to the mobile station 100. In another example, the controller 250 may acquire information indicating "chunk index: chunk 10, current quality level: low quality, quality level to be upgraded: high quality, and encoding method: SVC" from the chunk quality upgrading request message, and search chunk 10 corresponding to the high quality and then transmit enhancement-layer data which is additionally included in chunk 10 corresponding to a high quality in comparison with chunk 10 corresponding to a low quality to the mobile station 100.

Figure 6:
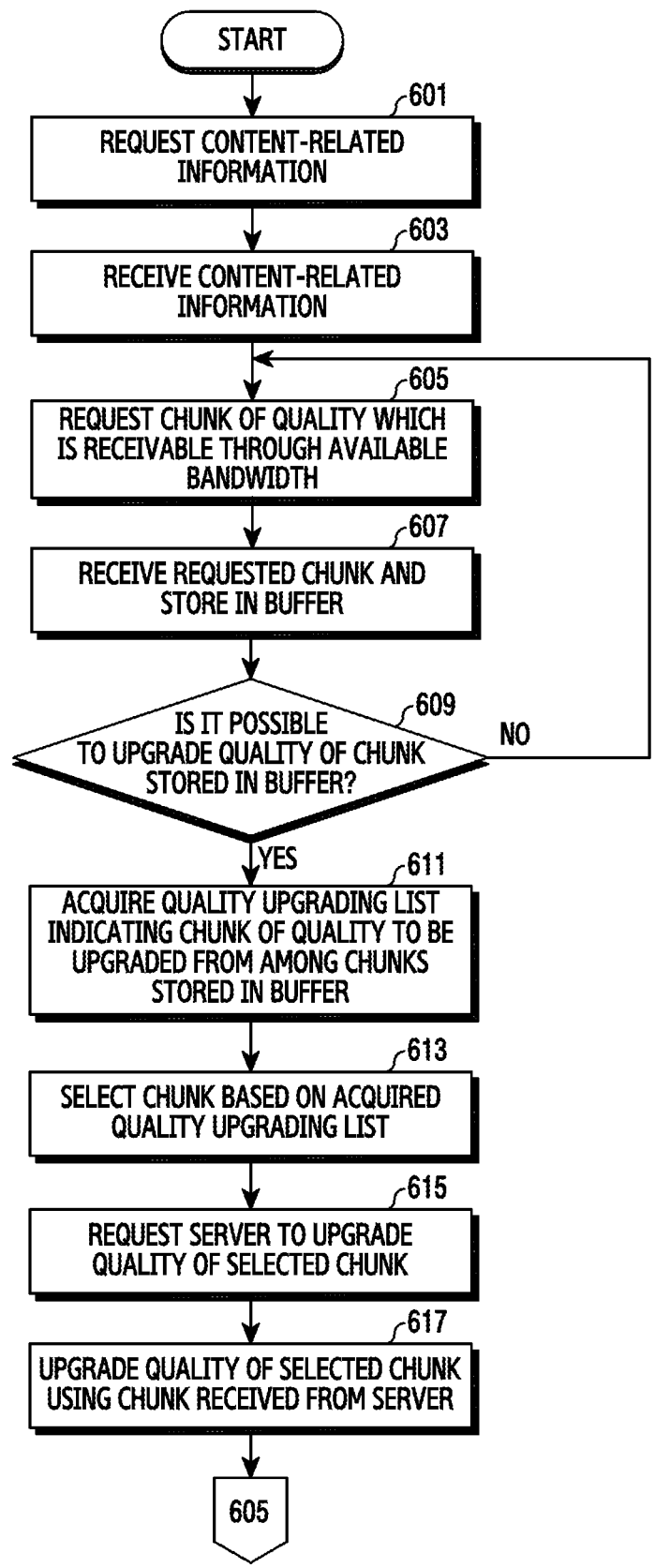
FIG. 6 illustrates a procedure for upgrading a quality of data which is stored in the buffer in the mobile station according to embodiments of the present disclosure.

FIG. 6 illustrates a procedure for upgrading a quality of data which is stored in the buffer in the mobile station according to embodiments of the present disclosure.

Referring to FIG. 6, when generation of a video streaming service event to reproduce a specific video content is detected, the mobile station 100 requests content-related information in step 601 and receive the content-related information in step 603. For example, the mobile station 100 may request, from the server 100, a manifest file including information on the video content which is requested to be reproduced by the user, and receive the manifest file regarding the corresponding video content from the server 100. The manifest file may include chunk size information, chunk index information, and quality level information regarding the corresponding video content.

The mobile station 100 requests a chunk of a quality which is receivable through an available bandwidth in step 605, and receives the from the server 110 and stores the chunk in the buffer in step 607. For example, the mobile station 100 may measure an available bandwidth every predetermined time, and determine an index and a quality of a chunk to be requested from the server 100 based on the measured available bandwidth and information acquired from the manifest file. The mobile station 100 may transmit the determined chunk quality and chunk index to the server 110, and request the server 100 to transmit a chunk corresponding to the corresponding quality and index. The mobile station 100 may receive the chunk corresponding to the corresponding quality and index and store the received chunk in the receiving buffer 102.

In step 609, the mobile station 100 may determine whether it is possible to upgrade the quality of the chunk stored in the buffer. For example, the mobile station 100 may determine whether it is possible to upgrade the quality of the chunk buffered in the receiving buffer 102 without influencing a new chunk which is received periodically for a video streaming service. For example, the mobile station 100 may determine whether it is possible to upgrade the quality of the chunk stored in the buffer based on a buffer level and the measured available bandwidth. The procedure for determining whether it is possible to upgrade the quality of the chunk stored in the buffer based on the buffer level and the measured available bandwidth will be explained in detail below with reference to FIG. 7.

When it is determined that it is not possible to upgrade the quality of the chunk stored in the buffer, the mobile station 100 may resume step 605 to request a next chunk of a quality which is receivable through the available bandwidth and perform the subsequent steps.

When it is determined that it is possible to upgrade the quality of the chunk stored in the buffer, the mobile station 100 acquires a quality upgrading list including a chunk of a quality to be upgraded from among the chunks stored in the buffer in step 611. The quality upgrading list may include index information of chunks which are selected based on a predetermined chunk selecting criterion, and additionally include quality level information and an encoding method of each of the selected chunks. The mobile station 100 may update the quality upgrading list based on the chunk selecting criterion at predetermined time intervals, at a predetermined event generation time, or every time a chunk is received. In addition, the mobile station 100 may detect whether the chunk the information of which is included in the quality upgrading list is reproduced or not, and delete information of the chunk which is detected as being reproduced from the quality upgrading list. The procedure for acquiring and updating the quality upgrading list will be explained in detail below with reference to FIG. 8.

In step 613, the mobile station 100 may select a chunk of a quality to be upgraded based on the acquired quality upgrading list. According to embodiments, the mobile station 100 may select a chunk of a quality to be upgraded from among all chunks except chunks which are likely to be reproduced within a threshold time from among the chunks the information of which is included in the acquired quality upgrading list. According to another embodiment, the mobile station 100 may select chunks of qualities to be upgraded in order of chunks which are determined to be reproduced at a later time from among the chunks the information of which is included in the acquired quality upgrading list.

In step 615, the mobile station 100 may request the server 110 to upgrade the quality of the selected chunk. According to embodiments, the mobile station 100 may transmit a message for requesting to upgrade the quality of the chunk to the server 110 during a period between the predetermined times at which a new chunk is requested. According to embodiments, the mobile station 100 may identify an encoding method of the chunk which is selected from the quality upgrading list and request to upgrade the quality of the chunk in a different method according to the identified encoding method. For example, when it is identified that chunk 4 selected from the quality upgrading list has a low quality and the encoding method is the AVC, the mobile station 100 may request the server 110 to transmit chunk 4 of a high quality. In another example, when it is identified that chunk 4 selected from the quality upgrading list has a low quality and the encoding method is the SVC, the mobile station 100 may request the server 110 to transmit enhancement-layer data including additional information for upgrading chunk 4 of the low quality to have a high quality. The message for requesting to upgrade the quality of the chunk may include an index of the selected chunk, information on a quality level to be upgraded, and information on the encoding method of the corresponding chunk.

In step 617, the mobile station 100 may upgrade the quality of the selected chunk using the chunk received from the server 110. For example, the mobile station 100 may upgrade the quality of the corresponding chunk by processing the received from the server 110 in response to the quality upgrading request in a different method according to the encoding method. According to embodiments, with respect to a chunk encoded in the AVC method, the mobile station 100 may substitute chunk 430 of a low quality which is stored in the receiving buffer 102 with chunk 432 received in response to the quality upgrading request as shown in FIG. 4B. In this case, the mobile station 100 may use a method for changing a pointer value indicating the chunk of the low quality which is stored in the receiving buffer 102 to indicate the chunk which is received in response to the quality upgrading request. In addition, the mobile station 100 may store the chunk which is received in response to the quality upgrading request using an additional separate receiving buffer. According to another embodiment, with respect to a chunk encoded in the SVC method, the mobile station 100 may combine chunk 550 of a low quality which is stored in the receiving buffer 102 and chunk 552 which includes enhancement-layer data received in response to the quality upgrading request as shown in FIG. 5B. In this case, the mobile station 100 may store additional information using an additional separate receiving buffer, and control to combine the additional information with chucks of low quality which are stored in the receiving buffer 102 to reproduce the chucks at a later time.

Thereafter, the mobile station 100 resumes step 605 to re-perform the subsequent steps.

Figure 7:
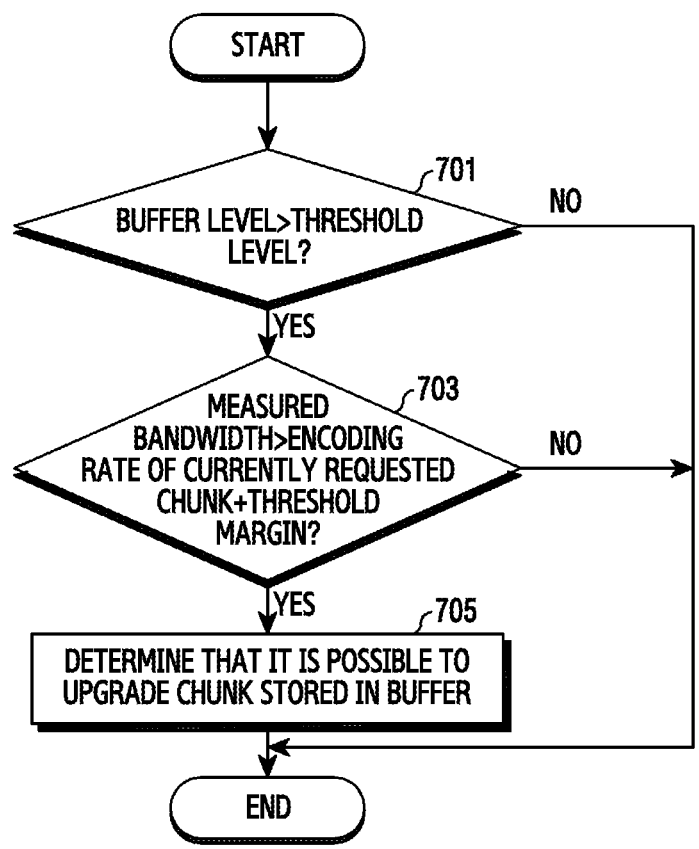
FIG. 7 illustrates a procedure for determining whether it is possible to upgrade a quality of data stored in the buffer in the mobile station according to embodiments of the present disclosure.

FIG. 7 illustrates a procedure for determining whether it is possible to upgrade a quality of data stored in the buffer in the mobile station according to embodiments of the present disclosure.

Referring to FIG. 7, the mobile station 100 determines whether a buffer level is higher than a threshold level by comparing the buffer level and the threshold level in step 701. For example, the mobile station 100 may determine whether a current buffer satisfies a condition for upgrading a quality of a chunk stored in the buffer by comparing the buffer level and the threshold level. When the buffer level is lower than or equal to the threshold level, the mobile station 100 may determine that the current buffer does not satisfy the condition for upgrading the quality of the chunk stored in the buffer and finishes the procedure according to the embodiment of the present disclosure.

When the buffer level is higher than the threshold level, the mobile station 100 may determine that the current buffer satisfies the condition for upgrading the quality of the chunk stored in the buffer, and check whether a measured available bandwidth is greater than an encoding rate of a chunk to be currently requested by more than a threshold margin in step 703. For example, the mobile station 100 may determine whether the currently available bandwidth satisfies the condition for upgrading the quality of the buffered chunk by checking whether the measured available bandwidth is greater than the encoding rate of the chunk to be currently requested by more than the threshold margin. When the available bandwidth is not greater than the encoding rate of the chunk to be currently requested by more than the threshold margin (encoding rate+threshold margin>=available bandwidth), the mobile station 100 may determine that the currently available bandwidth does not satisfy the condition for upgrading the quality of the chunk, and finishes the procedure according to the embodiment of the present disclosure.

When the available bandwidth is greater than the encoding rate of the chunk to be currently requested by more than the threshold margin (encoding rate+threshold margin<available bandwidth), the mobile station 100 may determine that the currently available bandwidth satisfies the condition for upgrading the quality of the chunk, and determine that it is possible to upgrade the quality of the chunk stored in the buffer in step 705 and finishes the procedure according to the embodiment of the present disclosure.

Figure 8:
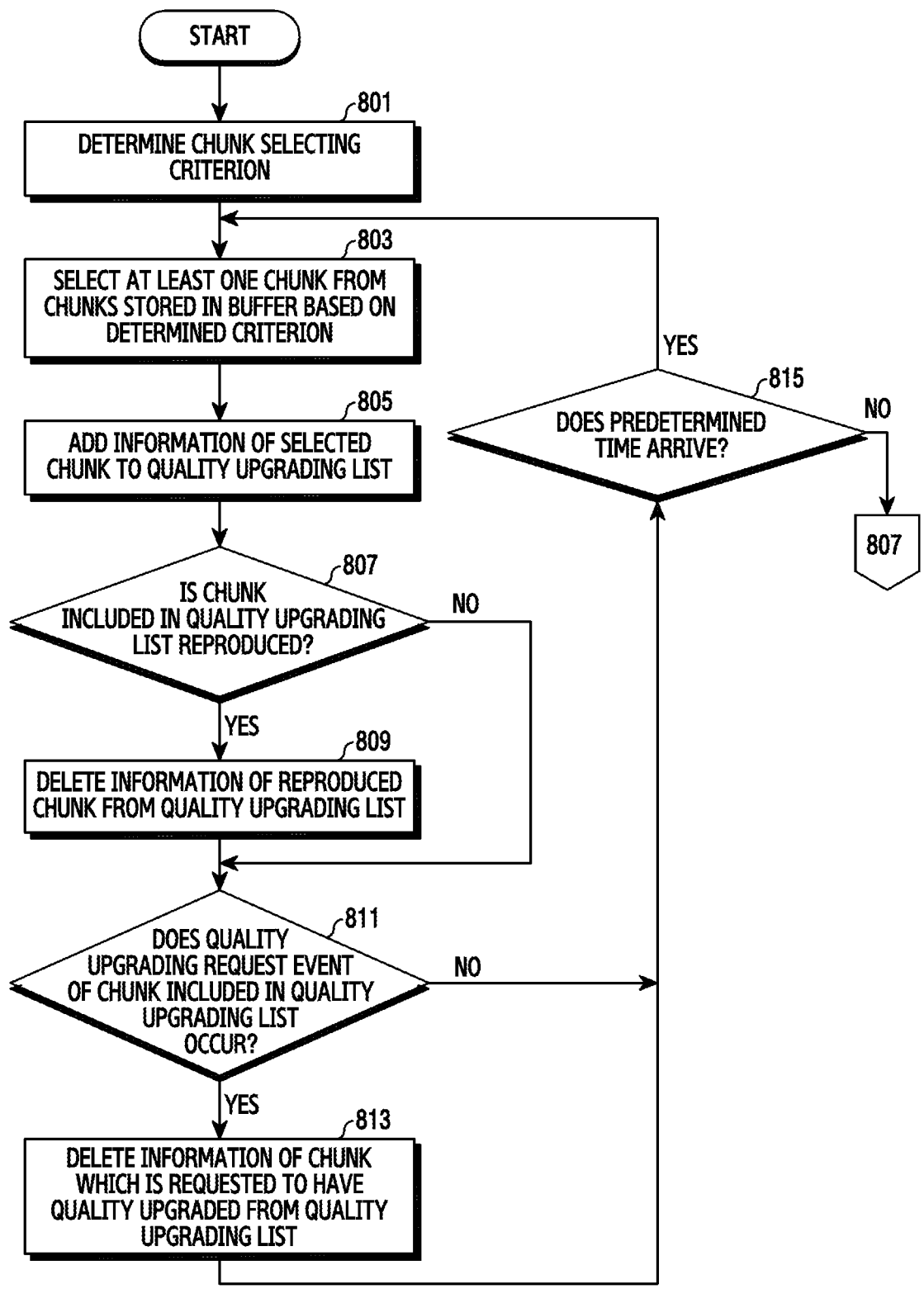
FIG. 8 illustrates a procedure for managing a data updating list in the mobile station according to embodiments of the present disclosure.

FIG. 8 illustrates a procedure for managing a quality upgrading list in the mobile station according to embodiments of the present disclosure.

Referring to FIG. 8, the mobile station 100 determines a chunk selecting criterion in step 801. For example, the mobile station 100 determines a criterion for selecting chunks of qualities to be upgraded from among the chucks stored in the receiving buffer 102. The mobile station 100 may identify quality level information indicating how many levels the quality of a video content is classified into from a manifest file, and determine the criterion for selecting a chunk of a quality to be upgraded based on the identified quality level information. The mobile station 100 may determine at least one of an upper bound, a lower bound, and a normal threshold as a criterion. The upper bound may be used as a criterion value for selecting all chunks except the chunks of the highest quality level from among the various quality levels of the corresponding video content. The lower bound may be used as a criterion value for selecting chunks of the lowest quality level from among the various quality levels of the corresponding video content. The normal threshold value may be determined based on a certain level from among the various quality levels of the corresponding video content, and may be used as a criterion value for selecting chunks having qualities lower than the determined level.

The mobile station 100 may select at least one chunk from among the chunks stored in the buffer based on the chunk selecting criterion in step 803, and add information on the selected chunk to the quality upgrading list in step 805. For example, the mobile station 100 may select chunks which satisfy the chunk selecting criterion from the chunks stored in the receiving buffer 102, and record the information on the selected chunks on the quality upgrading list. The information on the selected chunks may include an index of each of the selected chunks, quality level information of each of the selected chunks, and an encoding method. For example, it is assumed that chunks 1-9 are stored in the receiving buffer 102 of the mobile station 100, and chunks 1-5 have a "low quality," chunks 6-7 have a "high quality," and chunks 8-9 have a "medium quality" as shown in FIG. 1. In this case, when the chunk selecting criterion is the upper bound, the mobile station 100 may select chunks 1-5 and 8-9 from chunks 1-9 stored in the receiving buffer 102, and record indexes, quality levels, and encoding methods of selected chunks 1-5 and 8-9 on the quality upgrading list. As shown in FIG. 3, the encoding method may include an AVC method which is a non-layered method, and an SCV method which is a layered method, and additionally, may include an MPEG Media Transport (MMT) method which is a layered method (not shown). The MMT method is a method for expressing different qualities based on importance as known in the prior art.

The mobile station 100 may detect whether the chunk included in the quality upgrading list is reproduced or not in step 807. When the reproduction of the chunk included in the quality upgrading list is detected, the mobile station 100 may delete information on the reproduced chunk from the quality upgrading list in step 809. For example, in a state in which chunks 1-9 are stored in the receiving buffer 102 and the information of chunks 1-5 and 8-9 is included in the quality upgrading list, when chunks 1-3 are reproduced and thus are deleted from the receiving buffer 102, the mobile station 100 may delete information on chunks 1-3 from the quality upgrading list. On the other hand, when the reproduction of the chunk included in the quality upgrading list is not detected, the mobile station 100 directly proceeds to step 811 explained below.

In step 811, the mobile station 100 may detect whether a quality upgrading request event for the chunk included in the quality upgrading list is generated or not. When the quality upgrading request event for the chunk included in the quality upgrading list is detected, the mobile station 100 may delete information on the corresponding chunk from the quality upgrading list in step 813. For example, in the state in which chunks 1-9 are stored in the receiving buffer 102 and the information on chunks 1-5 and 8-9 is included in the quality upgrading list, when a message for requesting to upgrade the quality of chunk 9 is transmitted to the server 110, the mobile station 100 may delete the information on chunk 9 from the quality upgrading list. On the other hand, when the quality upgrading request event for the chunk included in the quality upgrading list is not detected, the mobile station 100 proceeds to step 815 explained below.

The mobile station 100 detects whether predetermined time arrives or not in step 815. When the predetermined time does not arrive, the mobile station 100 proceeds to step 807 to re-perform the subsequent steps, and, when the predetermined time arrives, the mobile station 10 proceeds to step 803 to re-perform the subsequent steps. Herein, the predetermined time refers to time to request and receive a new chunk from the server 110. For example, when the time to request and receive a new chunk arrives, the mobile station 100 resumes step 803 to determine whether a chunk newly stored in the receiving buffer 102 satisfies the chunk selecting criterion or not, and determine whether to add information on the new chunk to the quality upgrading list.

Figure 9:
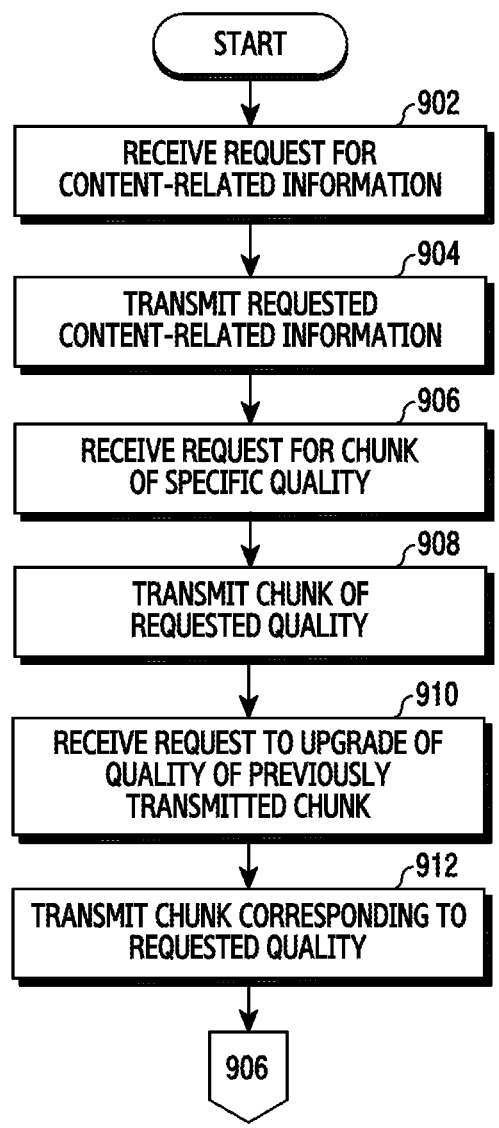
FIG. 9 illustrates an operation procedure of the server according to embodiments of the present disclosure.

FIG. 9 illustrates an operation procedure of the server according to embodiments of the present disclosure.

Referring to FIG. 9, the server 110 receives a request for content-related information from the mobile station 100 in step 902, and transmits the requested content-related information to the mobile station 100 in step 904. For example, the server 110 may receive a message for requesting to transmit a manifest file including information related to a specific video content, and retrieve the manifest file regarding the corresponding video content and transmit the manifest file. The manifest file may include size information, chunk index information, and quality level information regarding the corresponding video content.

The server 110 receives a message for requesting a chunk of a specific quality from the mobile station 100, and transmits the chunk of the quality as requested to the mobile station 100 in step 908. For example, the server 110 may receive a chunk transmission request message including an index and a quality of a chunk from the mobile station 100 every predetermined time. The server 110 may search a chunk corresponding to the quality and the index included in the chunk transmission request message, and may transmit the searched chunk to the mobile station 100.

The server 110 may receive a message for requesting to upgrade a quality of a chunk which has been previously transmitted to the mobile station 100 in step 910, and transmit a chunk corresponding to the requested quality to the mobile station 100 in step 912. The message for requesting to upgrade the quality of the may include an index of the chunk, information on a quality level to be upgraded, and information on an encoding method of the corresponding chunk. For example, when the server 110 identifies "chunk index: 4, target quality level: high quality, and encoding method: AVC" from the message for requesting to upgrade the quality of the chunk, the server 110 may transmit chunk 4 of a high quality to the mobile station 100. In another example, when the server 110 identifies "chunk index: 4, current quality level: low quality, target quality level: high quality, and encoding method: SVC" from the message for requesting to upgrade the quality of the chunk, the server 110 may transmit a chunk indicating enhancement-layer data which is additionally included in chunk 4 of a high quality in comparison with chunk 4 of a low quality to the mobile station 100. Thereafter, the server 110 resumes step 906 to re-perform the subsequent steps.

In the above-described embodiments, the quality of the chunk is divided into a low level, a medium level, and a high level for convenience of explanation. However, the quality of the chunk may be classified into more levels or may be expressed in other methods. For example, the quality of the chunk may be classified into 1-5 levels.

Figure 10A:
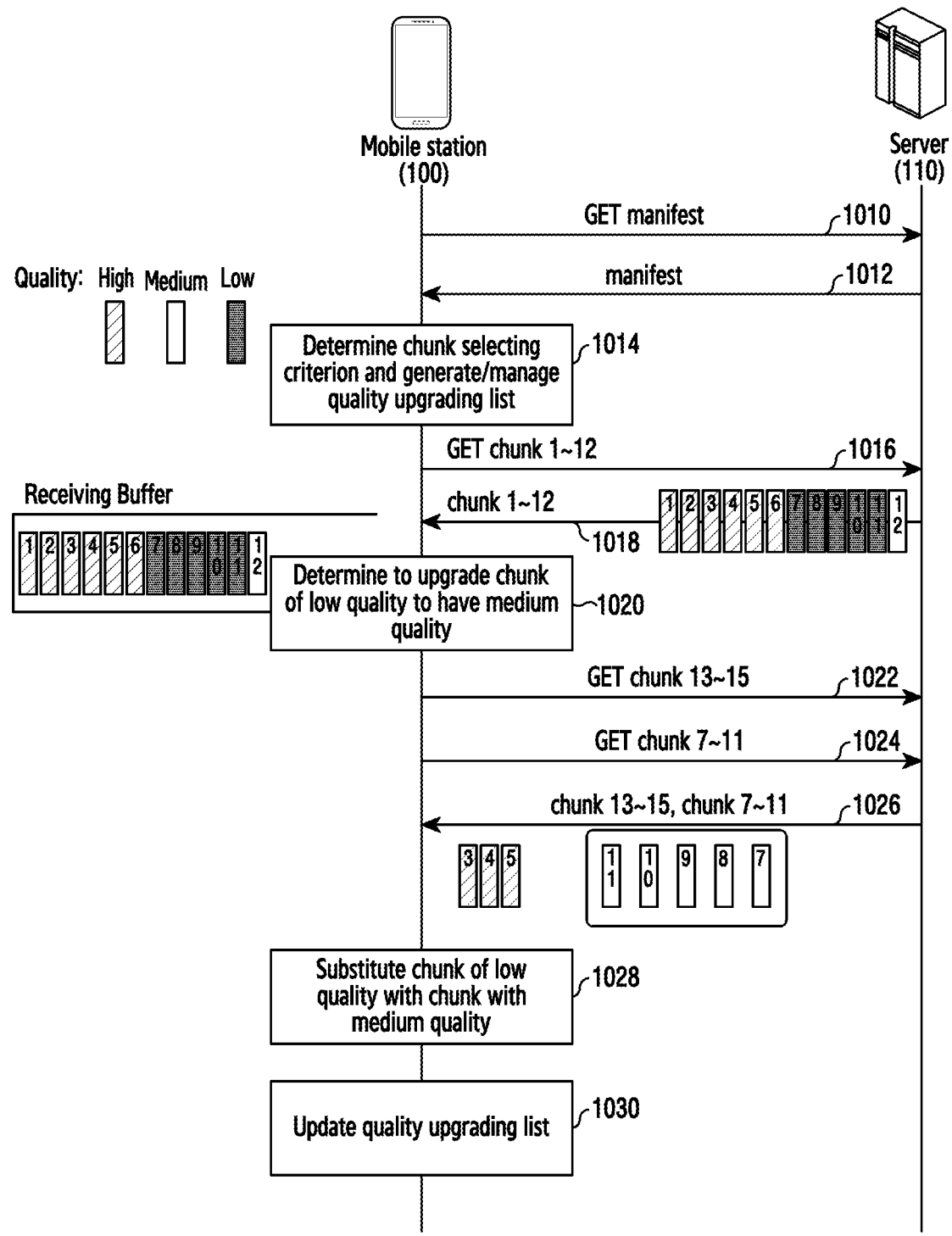
FIG. 10A illustrates a signal flow for upgrading a quality of data which supports AVC according to embodiments of the present disclosure.

FIG. 10A illustrates a signal flow for updating a quality of data which supports AVC according to embodiments of the present disclosure.

Referring to FIG. 10A, the mobile station 100 requests a manifest file including content-related information from the server 110 in step 1010. The server 110 may transmit the manifest file to the mobile station 100 in response to the request of the mobile station 100 in step 1012. The manifest file may include chunk size information, chunk index information, and quality level information regarding a corresponding video content.

In step 1014, the mobile station 100 determines a chunk selecting criterion and generates and manages a quality upgrading list according to the determined chunk selecting criterion. For example, the mobile station 100 may identify that the quality of the video content is classified into three levels, namely, "low, medium, and high levels," from the manifest file, and determine a criterion for selecting a chunk of a quality to be upgraded based on the identified quality level information. In the embodiment of FIG. 10A, the mobile station 100 may determine a lower bound as the chunk selecting criterion. For example, the mobile station 100 may select a chunk of a low quality and determine to upgrade the quality of the chunk of the low quality by one level (that is, to have a medium level).

As in steps 1016 and 1018, the mobile station 100 may request new chunks 1-12 from the server 110, and the server 110 may transmit chunks 1-12 to the mobile station 100. For example, the mobile station 100 may request new chunks one by one every predetermined time, and receive chunks 1-12. Although the step of requesting chunks 1-12 and the step of receiving chunks 1-12 each is expressed as a single step for convenience of explanation, the mobile station 100 may request and receive a new single chunk every predetermined time. In addition, the mobile station 100 may determine a quality regarding each of the new chunks based on an estimated available bandwidth when requesting the new chunks, and may request a chunk having the determined quality.

After receiving up to chunk 12, the mobile station 100 may detect that it is possible to upgrade the qualities of the chunks stored in the buffer, and determine to upgrade the chunk of a low quality to have a medium quality as in step 1020. For example, the mobile station 100 may include chunks 7-11 of low quality satisfying the lower bound from among chunks 1-12 buffered in the receiving buffer 102 in the quality upgrading list, and then determine to upgrade chunks 7-11 included in the quality upgrading list to chunks of medium quality.

As in steps 1022 and 1024, the mobile station 100 may request to transmit new chunks 13-15 and request to upgrade the qualities of chunks 7-11 at the time when the mobile station 100 does not request the new chunks. As in step 1026, the server 110 may transmit new chunks 13-15 and chunks 7-11. In the embodiment of FIG. 10A, the step of requesting new chunks 13-15, the step of requesting chunks 7-11, and the step of receiving chunks 13-15 and 7-11 each is illustrated as a single step for convenience of explanation. However, the mobile station 100 may request and receive new chunks 13-15 every predetermined time. In addition, the mobile station 100 may request and receive chunks 7-11 for upgrading quality during a period between the times when chunks 13-15 are requested. For example, the mobile station 100 may request and receive chunk 13 at predetermined time and then request and receive chunks 7 and 8 of a medium quality. Thereafter, the mobile station 100 may request and receive 14 when the predetermined time arrives and then request and receive chunks 9 and 10 of a medium quality. In addition, the mobile station 100 may request and receive chunk 15 when the predetermined time arrives and then may request and receive chunk 11 of a medium quality.

Figure 10B:
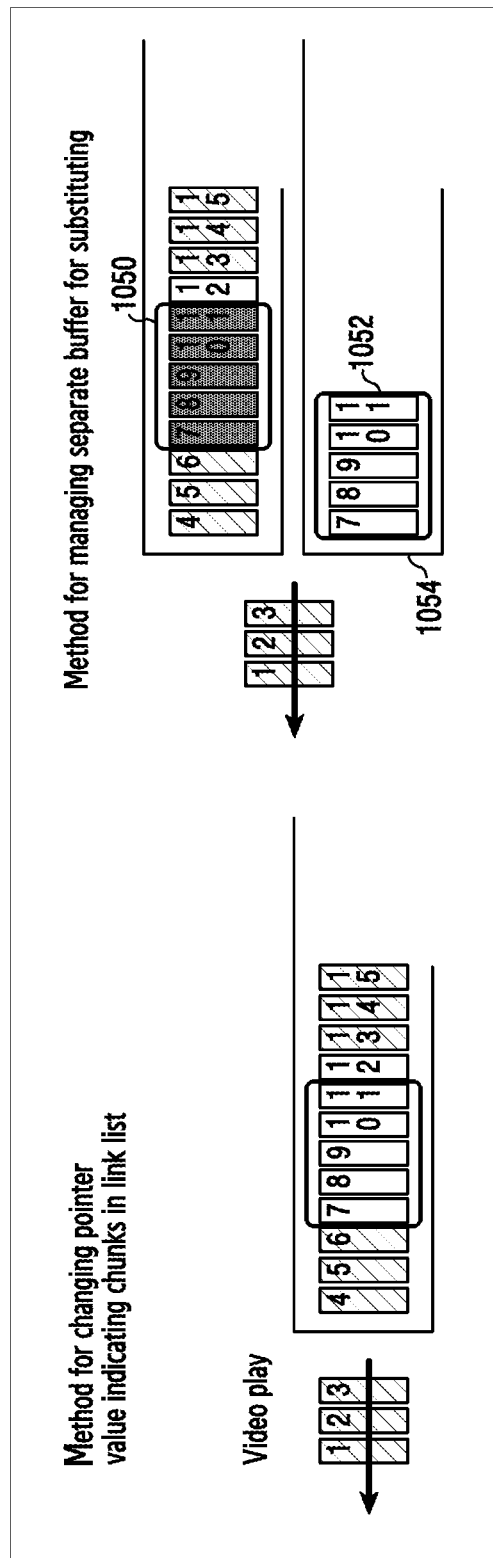
FIG. 10B illustrates a method for storing data to upgrade a quality of data which supports AVC in the mobile station according to embodiments of the present disclosure.

In step 1028, the mobile station 100 substitutes a of the low quality with a chunk of a medium quality. According to various embodiments of the present disclosure, as shown in FIG. 10B, the mobile station 100 may substitute chunks 1050 of a low quality with chunks 1052 of a medium quality by changing a pointer value indicating chunks 7-11 of a low quality stored in the receiving buffer 102 to indicate chunks 7-11 of a low quality which are received in response to the quality upgrading request. According to various embodiments of the present disclosure, the mobile station 100 may store chunks 7-11 of the medium quality using an additional separate receiving buffer 1054 as shown in FIG. 10B.

Thereafter, the mobile station 100 may update the quality upgrading list in step 1030. For example, the mobile station 100 may delete information on the chucks the qualities of which are upgraded from information of the chucks of the low quality included in the quality upgrading list.

Figure 11A:
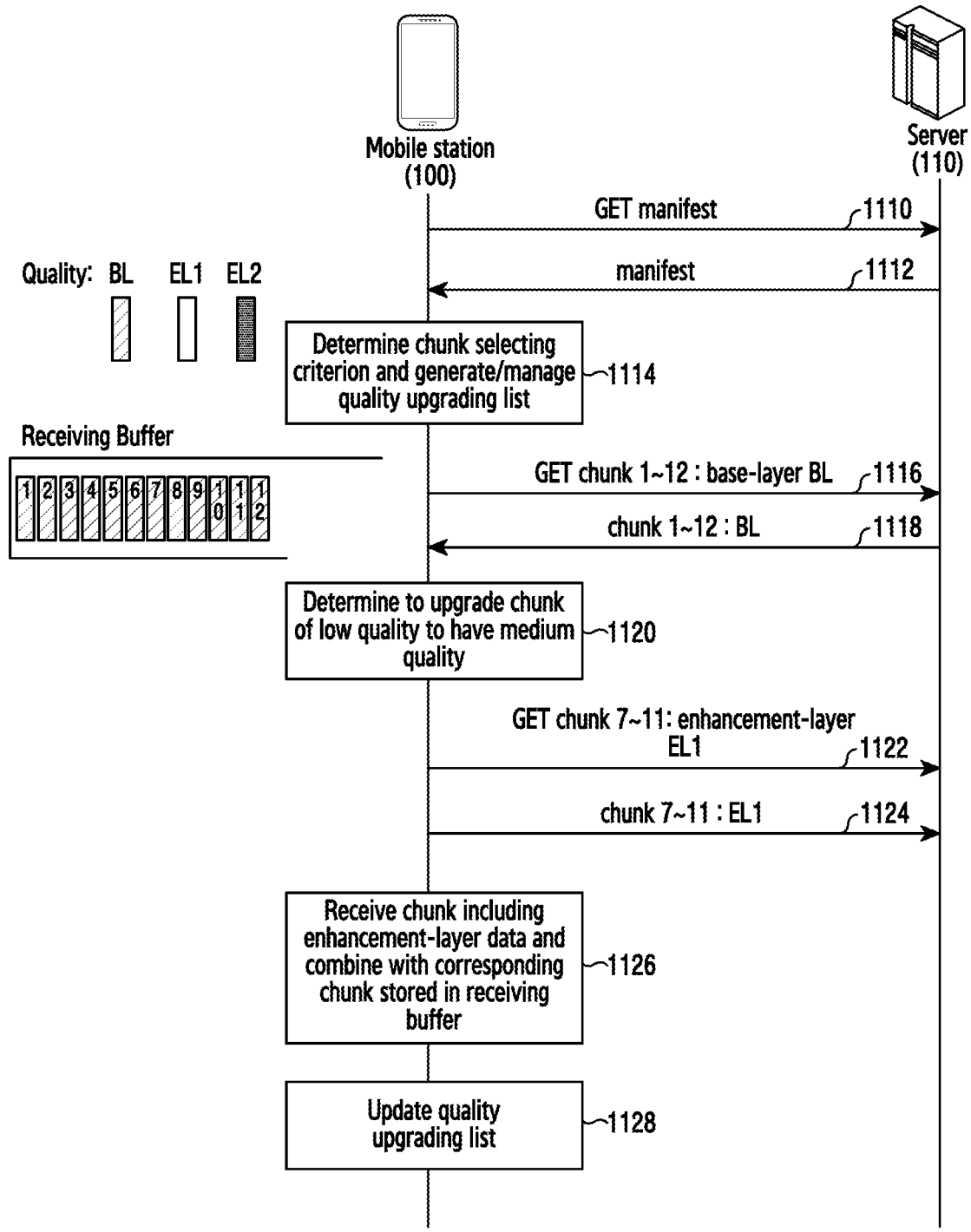
FIG. 11A illustrates a signal flow for upgrading a quality of data which supports SVC according to embodiments of the present disclosure.

FIG. 11A illustrates a signal flow for updating a quality of data which supports SVC according to embodiments of the present disclosure.

Referring to FIG. 11A, the mobile station 100 requests a manifest file including content-related information from the server 110 in step 1110. The server 110 may transmit the manifest file to the mobile station 100 in response to the request of the mobile station 100 in step 1112. The manifest file may include chunk size information, chunk index information, and quality level information regarding a corresponding video content.

In step 1114, the mobile station 100 determines a chunk selecting criterion and generates and manages a quality upgrading list according to the determined chunk selecting criterion. For example, the mobile station 100 may identify that the quality of the video content is classified into three levels, namely, "low, medium, and high levels," from the manifest file, and determine a criterion for selecting a chunk of a quality to be upgraded based on the identified quality level information. In the embodiment of FIG. 11A, the mobile station 100 may determine a lower bound as the chunk selecting criterion. For example, the mobile station 100 may select a chunk of a low quality and determine to upgrade the quality of the chunk of the low quality by one level (that is, to have a medium level).

As in steps 1116 and 1118, the mobile station 100 may request new chunks 1-12 from the server 110, and the server 110 may transmit chunks 1-12 to the mobile station 100. For example, the mobile station 100 may request new chunks one by one every predetermined time, and receive chunks 1-12. Although the step of requesting chunks 1-12 and the step of receiving chunks 1-12 each is expressed as a single step for convenience of explanation, the mobile station 100 may request and receive a new single chunk every predetermined time. In addition, the mobile station 100 may determine a quality of each of the new chunks based on an estimated available bandwidth when requesting the new chunks, and may request a having the determined quality. Herein, for convenience of explanation, it is assumed that a low quality is determined for chunks 1-12 and only base-layer data corresponding to the low quality is requested and received.

After receiving up to chunk 12, the mobile station 100 may detect that it is possible to upgrade the qualities of the chunks stored in the buffer, and determine to upgrade the chunk of the low quality to have a medium quality as in step 1120. For example, the mobile station 100 may include, in the quality upgrading list, chunks 1-12 of a low quality satisfying the lower bound from among chunks 1-12 buffered in the receiving buffer 102, and then determine to upgrade chunks 7-11 from among chunks 1-12 included in the quality upgrading list to chunks of a medium quality considering reproduction.

As in steps 1122 and 1124, the mobile station 100 may request to upgrade the qualities of chunks 7-11 at the time when the mobile station 100 does not request new chunks, and the server 110 may transmit chunks for upgrading the qualities of chunks 7-11 requested by the mobile station 100. Herein, the mobile station 100 may request to transmit a new chunk (for example, chunk 13) and request to upgrade the qualities of chunks 7-11 at the time when the mobile station 100 does not request new chunks. In the embodiment of FIG. 11A, the step of requesting new chunks after determining to upgrade the quality of the chunk is omitted for convenience of explanation, but new chunks may be requested every predetermined time intervals until the corresponding video content is completely received. In addition, the step of requesting chunks 7-11 and the step of receiving chunks 13-15 and 7-11 each is illustrated as a single step for convenience of explanation. However, chunks 7-11 for upgrading the quality may be requested and received during a period between the times at which the new chunks are requested. For example, the mobile station 100 may request and receive chunk 13 at predetermined time and then request to transmit primary enhancement-layer data necessary for upgrading chunks 7 and 8 to have a medium quality, and receive chunks including the primary enhancement-layer data regarding chunks 7 and 8. Thereafter, the mobile station 100 may request and receive chunk 14 when the predetermined time arrives and then request to transmit primary enhancement-layer data regarding chunks 9 and 10 of a medium quality and receive chunks including the primary enhancement-layer data regarding chunks 9 and 10. In addition, the mobile station 100 may request and receive chunk 15 when the predetermined time arrives and then may request to transmit primary enhancement-layer data regarding chunk 11 of the medium quality and receive chunks including the primary enhancement-layer data regarding chunks 9 and 10.

Figure 11B:
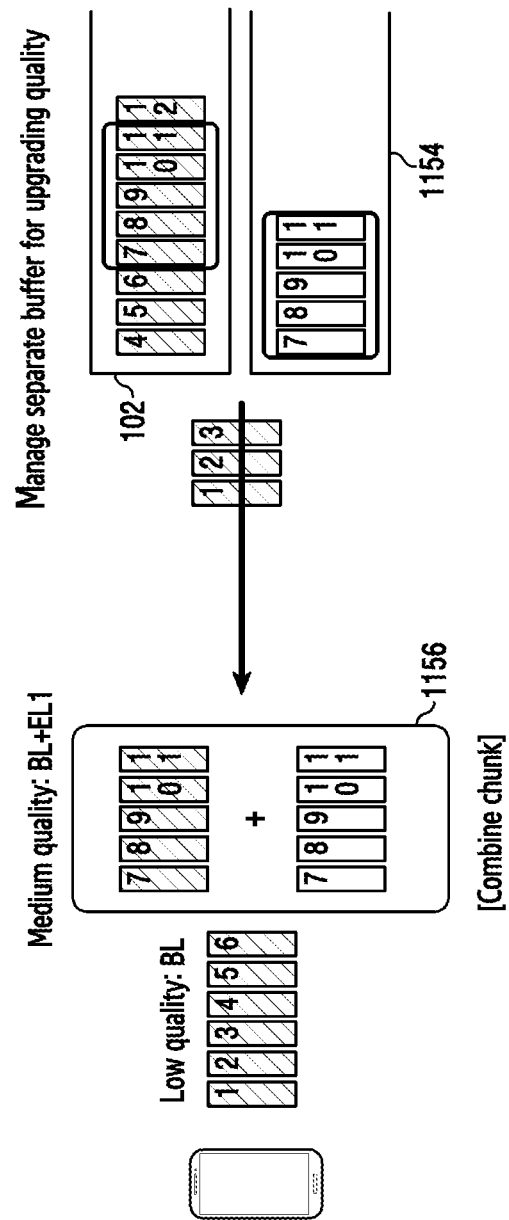
FIG. 11B illustrates a method for storing data to upgrade a quality of data which supports SVC in the mobile station according to embodiments of the present disclosure.

The mobile station 100 may upgrade the quality by combining the chunks including the enhancement-layer data and the corresponding chunk stored in the receiving buffer 102 in step 1126. According to various embodiments of the present disclosure, as shown in FIG. 11B, the mobile station 100 may store the chunks including the enhancement-layer data in an additional separate receiving buffer 1154 in addition to the receiving buffer 102, and then combine the chunk including the base-layer data, which is stored in the receiving buffer 102, and the chunk including the enhancement-layer data, which is stored in the separate buffer, and control to reproduce the combined chunk 1156 of the medium quality.

Thereafter, the mobile station 100 may update the quality upgrading list in step 1128. For example, the mobile station 100 may delete information on the chunks the qualities of which are upgraded from among information of the chunks of the low quality included in the quality upgrading list.

Figure 12:
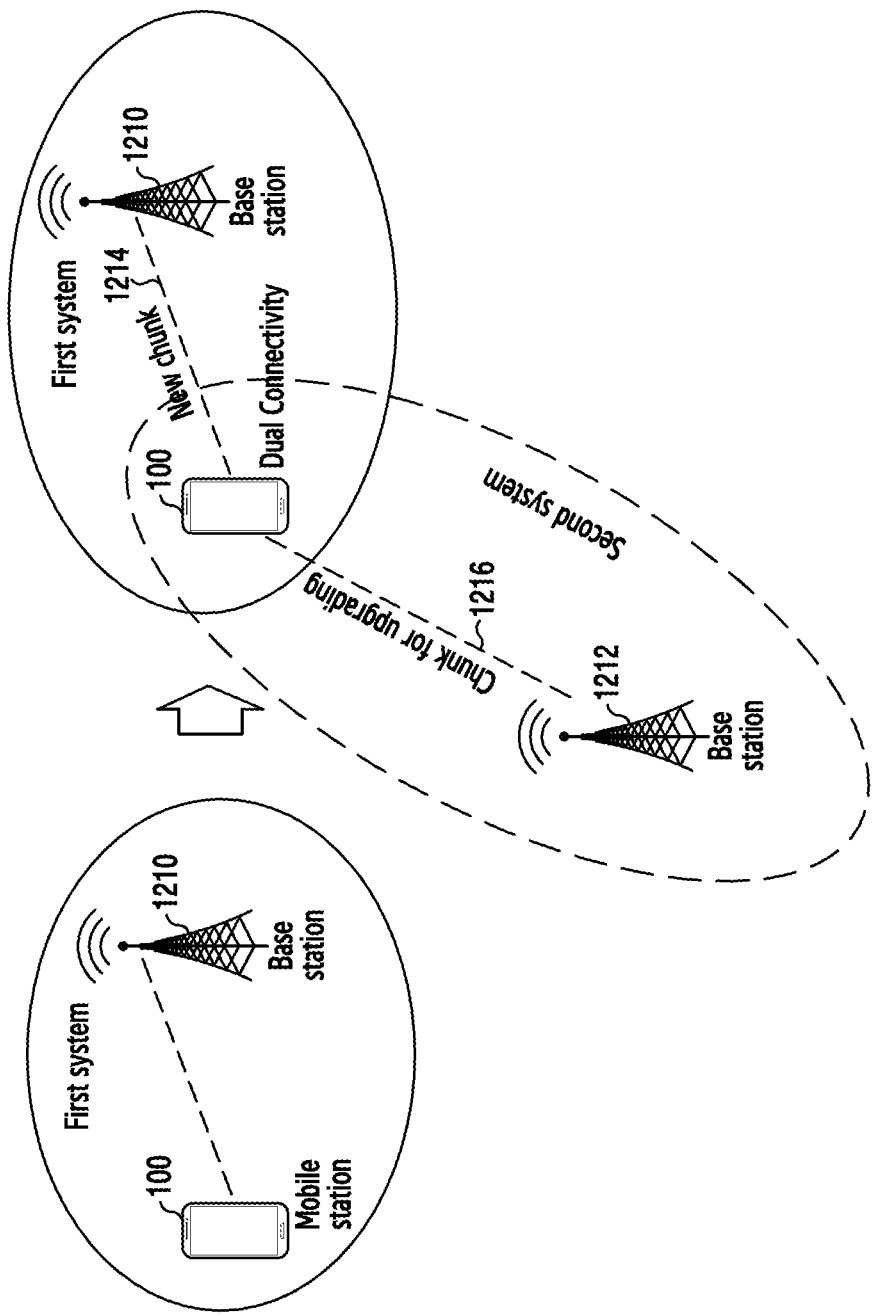
FIG. 12 illustrates a network configuration for upgrading a data quality according to another embodiment of the present disclosure.

FIG. 12 illustrates a network configuration for updating a data quality according to another embodiment of the present disclosure.

Referring to FIG. 12, the mobile station 100 according to embodiments of the present disclosure may communicate with the server 110 through a base station 1210 which supports a first system (for example, an LTE system), and provide a video streaming service.

According to another embodiment of the present disclosure, when the mobile station 100 supports simultaneous connection to various systems, the mobile station 100 may receive a new chunk 1214 of a video content from the server 110 through the base station 1210 supporting the first system every predetermined time, and simultaneously, may receive a chunk 1216 of a specific quality for upgrading the quality of the chunk stored in the receiving buffer 102 or a chunk including additional information necessary for upgrading to a specific quality through a base station or an Access Point (AP) 1212 that supports a second system (for example, a WiFi system). In this way, there is a high possibility that a margin bandwidth for upgrading qualities of chunks stored in the buffer, and an effect of solving a charging problem can be achieved.

According to embodiments of the present disclosure, the mobile station 100 may determine whether to upgrade a quality of a chunk stored in the receiving buffer 102 according to user setting and/or a user request. For example, when the user setting indicates that the quality of the stored chunk is not upgraded, the mobile station 100 may not upgrade the quality of the stored chunk even when a buffer level and an estimated available bandwidth satisfy the quality upgrading condition. On the other hand, when the user setting indicates that the quality of the stored chunk is upgraded, the mobile station 100 may perform the function for upgrading the quality of the stored chunk based on the buffer level and the estimated available bandwidth.

In addition, according to embodiments of the present disclosure, the mobile station 100 may determine a system to receive a new chunk and a system to receive a chunk for upgrading a quality according to user setting and/or a user request. The system to receive the new chunk and the system to receive the chunk for upgrading the quality may be the same or may be set differently.

In addition, in the embodiments of the present disclosure, the chunk selecting criterion may be determined according to user setting. For example, the chunk selecting criterion may be set and/or changed based on an image quality (for example, a quality) of a video content requested by the user. According to another embodiment, the chunk selecting criterion may be changed according to an estimated available bandwidth.

In addition, in the embodiments of the present disclosure, the determining the target quality of the selected chunk to the highest level or the determining the target quality to be higher than the current quality of the selected chunk by more than one level has been described. According to various embodiments, the target quality of the selected chunk may be determined according to the chunk selecting criterion. For example, when the upper bound is selected, the qualities of all of the selected chunks may be determined to be upgraded to have the highest quality level. In another example, when the lower bound is selected, the quality of the selected chunk may be determined to have a quality level higher than the current quality level by one level. In another example, when a certain level is selected as the criterion, the quality of the selected chunk may be determined to be upgraded to have a quality level higher than the quality level of the chunk by more than one level. According to various embodiments of the present disclosure, the target quality of the selected chunk may be equally determined for all of the selected chunks, and the target quality may be individually determined considering the current quality of each of the selected chunks.

Figure 13:
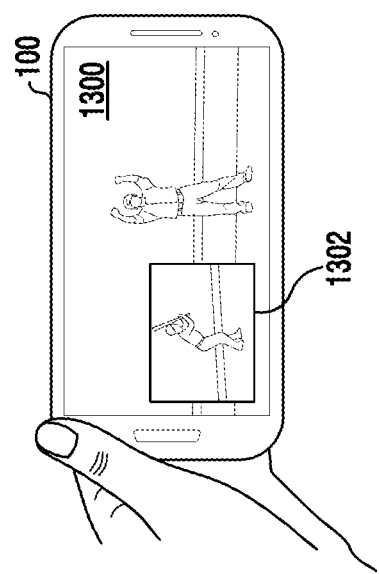
FIG. 13 illustrates an example of providing a multi-view in the mobile station according to another embodiment of the present disclosure.
Figure 13:
Figure 13:
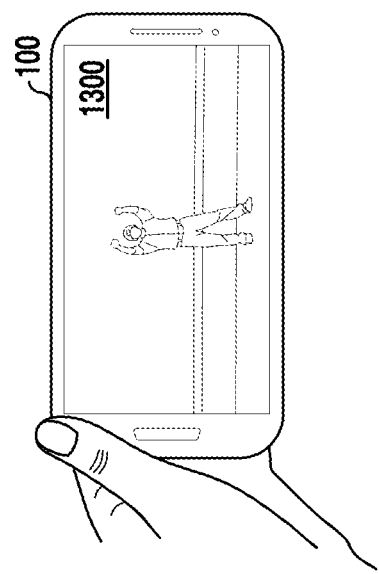

In the above-described embodiments of the present disclosure, a method and apparatus for upgrading a quality of a buffered while the mobile station 100 requests and receives a new chunk of a video content based on a buffer level and a result of measuring a currently available bandwidth has been described. However, according to various embodiments of the present disclosure, the mobile station 100 may receive an additional for a multi-view while requesting and receiving a new chunk of a video content based on a buffer level and a result of measuring a currently available bandwidth. For example, as shown in FIG. 13, when a buffer level is higher than a predetermined threshold level and an available bandwidth is greater than an encoding rate of a chunk to be currently requested by more than a threshold margin while the mobile station 100 provides a streaming service regarding a baseball content 1300, the mobile station 100 may request a chunk indicating another image 1302 related to the baseball content and provide a multi-view.

As described above, the present disclosure has been described with limited embodiments and drawings. However, the present disclosure is not limited to the above-described embodiments and can be modified and changed by a person skilled in the art from the descriptions provided herein.

The operations according to the embodiments of the present disclosure may be implemented by a single controller. In this case, program commands for performing operations implemented by various computers may be recorded in a computer-readable medium. The computer-readable recording medium may include program commands, data files, and data structures either alone or in combination. The program commands may be those that are especially designed and configured for the present disclosure. Examples of the computer-readable recording medium include magnetic recording media such as hard disks, floppy disks and magnetic tapes, optical recording media such as CD-ROMs and DVDs, magneto-optical recording media such as floptical disks, and hardware devices such as ROMs, RAMs and flash memories that are especially configured to store and execute program commands. Examples of the program commands include machine language codes created by a compiler, and high-level language codes that can be executed by a computer using an interpreter. When all or some of base stations or relays described in the present disclosure is implemented by a computer program, a computer-readable recording medium storing the computer program is also included in the present disclosure. Therefore, the scope of the invention is defined not by the detailed description of the embodiments but by the appended claims, and the equivalents to the scopes of the claims.

Although the present disclosure has been described with embodiments, various changes and modifications may be suggested to one skilled in the art. It is intended that the present disclosure encompass such changes and modifications as fall within the scope of the appended claims.

What is claimed is:

1. A method performed by a mobile station, the method comprising:
transmitting, to a server, a first message for requesting a plurality of chunks, wherein each chunk corresponds to each of a plurality of chunk indices of a content;
receiving, from the server, the plurality of chunks that are transmitted in response to the first message;
storing the plurality of chunks in a buffer of the mobile station;
determining whether to improve qualities of the plurality of received chunks based on an available bandwidth and a capacity of the buffer;
identifying low-quality chunks having qualities lower than a reference quality among the plurality of chunks stored in the buffer;
identifying a first chunk with a first quality among the low-quality chunks, the first chunk to be played at the mobile station after a threshold time;
transmitting, to the server, a second message for requesting a second chunk with a second quality higher than the first quality, wherein the second chunk corresponds to the first chunk; and
receiving, from the server, the second chunk with the second quality in response to the second message,
wherein the second chunk or a combination of the first chunk and the second chunk is an alternative to the first chunk.

2. The method of claim 1, further comprising:
identifying that the qualities of the plurality of the received chunks comprising the first chunk stored in the buffer is not available to be updated, based on the available bandwidth and the capacity of the buffer; and
based upon identifying that qualities of the plurality of the received chunks stored in the buffer are not available to be updated, transmitting, to the server, a third message for requesting a third chunk corresponding to the second chunk.

3. The method of claim 2, further comprising:
identifying that the capacity of the buffer indicating an amount of the chunks stored in the buffer is greater than a threshold level;
identifying that the available bandwidth is greater than a sum of an encoding rate of current chunks to be requested to the server and a threshold value; and
based upon identifying that the available bandwidth is greater than the sum of the encoding rate of the current chunks to be requested to the server and the threshold value, determining that a quality of the stored in the buffer is available to be updated.

4. The method of claim 3, wherein the identifying the low-quality chunks having qualities comprises:
obtaining a list indicating the low-quality chunks having a quality lower than the reference quality among the plurality of chunks stored in the buffer;
wherein the list comprises information on a chunk index, a chunk quality, and an encoding method, and
wherein the list is updated based on whether the first chunk with the first quality is played or not, and whether a request for updating a quality of the first chunk is transmitted or not.

5. The method of claim 4, wherein the identifying the first chunk with the first quality from the list based on play times for the each of the low-quality chunks comprises:
identifying the first chunk in an order of chunks that are determined to be played at a later time in the list.

6. The method of claim 2,
wherein the available bandwidth is obtained based on a size of chunks requested to the server and a total time for downloading the chunks requested to the server, and wherein the available bandwidth is measured for each of the chunks received and is used for determining a quality of chunks to be received at the next time.

7. The method of claim 1, wherein the second message comprises:
a first chunk index of the first chunk,
a target quality of the first chunk,
a current quality of the first chunk, and
an encoding method of the first chunk.

8. The method of claim 1, further comprising:
performing a control of re-producing the content by updating a quality of the first chunk from the first quality to the second quality by using the second chunk received from the server.

9. The method of claim 8, wherein the control of re-producing the content by updating the quality of the first chunk stored in the buffer from the first quality to the second quality by using the second chunk with the second quality received from the server comprises:
substituting the first chunk with the second chunk by changing a value of a pointer to indicate the second chunk; or
combining the first chunk and the second chunk by adding an additional data in the second chunk to the first chunk.

10. The method of claim 1, wherein the second message is transmitted during a period between predetermined times at which an un-buffered chunk is requested.

11. The method of claim 1, wherein the first chunk comprises a to be played at a latest time from among the low-quality chunks.

12. The method of claim 1, in case that the content is encoded by a non-layered encoding scheme, the second is the alternative to the first chunk, and
in case that the content is encoded by a layered encoding scheme, the combination of the first chunk and the second chunk is the alternative to the first chunk.

13. A mobile station comprising:
at least one transceiver;
a buffer; and
at least one processor configured to:
transmit, to a server, a first message for requesting a plurality of chunks, wherein each chunk corresponds to each of a plurality of chunk indices of a content,
receive, from the server, the plurality of chunks that are transmitted in response to the first message,
store the plurality of chunks in the buffer of the mobile station,
determine whether to improve qualities of the plurality of received chunks based on an available bandwidth and a capacity of the buffer,
identify low-quality chunks having qualities lower than a reference quality among the plurality of chunks stored in the buffer,
identify a first chunk with a first quality among the low-quality chunks, the first quality to be played at the mobile station after a threshold time,
transmit, to the server, a second message for requesting a second chunk with a second quality higher than the first quality, wherein the second chunk corresponds to the first chunk, and
receive, from the server, the second chunk with the second quality in response to the second message,
wherein the second chunk or a combination of the first chunk and the second chunk is an alternative to the first chunk.

14. The mobile station of claim 13, wherein the at least one processor is further configured to:
identify that the qualities of the plurality of the received chunks comprising the first chunk stored in the buffer are not available to be updated, based on the available bandwidth and the capacity of the buffer, and
based upon identifying that the qualities of the plurality of the received chunks stored in the buffer are not available to be updated, transmit, to the server, a third message for requesting a third chunk corresponding to the second chunk.

15. The mobile station of claim 14, wherein the at least one processor is further configured to:
identify that the capacity of the buffer indicating an amount of the chunks stored in the buffer is greater than a threshold level,
identify that the available bandwidth is greater than a sum of an encoding rate of current chunks to be requested to the server and a threshold value, and
based upon identifying that the available bandwidth is greater than the sum of the encoding rate of the current chunks to be requested to the server and the threshold value, determine that a quality of the chunks stored in the buffer is available to be updated.

16. The mobile station of claim 15, wherein the at least one processor is further configured to:
obtain a list indicating low-quality chunks having a quality lower than the reference quality among the chunks stored in the buffer,
wherein the list comprises information on a chunk index, a chunk quality, and an encoding method, and
wherein the list is updated based on whether the first chunk with the first quality is played or not, and whether a request for updating a quality of the first chunk is transmitted or not.

17. The mobile station of claim 13, wherein the second message comprises:
a first chunk index of the first chunk,
a target quality of the first chunk,
a current quality of the first chunk, and
an encoding method of the first chunk.

18. A server comprising:
at least one transceiver configured to communicate with a mobile station; and
at least one processor configured to:
receive, from the mobile station, a first message for requesting a plurality of chunks, wherein each chunk corresponds to each of a plurality of chunk indices of a content,
transmit, to the mobile station, the plurality of chunks including a first chunk with a first quality in response to the first message,
receive, from the mobile station, a second message for requesting a second chunk with a second quality higher than the first quality, wherein the second chunk corresponds to the first chunk, and
transmit, to the mobile station, the second chunk with the second quality in response to the second message,
wherein the second message is transmitted from the mobile station, based on a determination whether to improve qualities of the plurality of chunks based on at least one of an available bandwidth or available capacity of a buffer, wherein the first chunk is one of low-quality chunks having qualities lower than a reference quality, the first chunk to be played at the mobile station after a threshold time, and wherein the second chunk or a combination of the first chunk and the second chunk is an alternative to the first chunk.

19. The server of claim 18, wherein the second message is received during a period between predetermined times at which an un-buffered chunk is requested.

20. The server of claim 18, wherein the first chunk comprises a to be played at a latest time from among the low-quality chunks.

* * * * *